United States Patent
Borgqvist et al.

(10) Patent No.: US 12,527,899 B2
(45) Date of Patent: Jan. 20, 2026

(54) RENAL FAILURE THERAPY SYSTEMS HAVING REDUCED TIME BETWEEN TREATMENTS

(71) Applicant: GAMBRO LUNDIA AB, Lund (SE)

(72) Inventors: Per-Olof Borgqvist, Lund (SE); Olof Jansson, Vellinge (SE)

(73) Assignee: Gambro Lundia AB, Lund (SE)

(*) Notice: Subject to any disclaimer, the term of this patent is extended or adjusted under 35 U.S.C. 154(b) by 550 days.

(21) Appl. No.: 18/017,980

(22) PCT Filed: Jun. 23, 2021

(86) PCT No.: PCT/EP2021/067053
§ 371 (c)(1),
(2) Date: Jan. 25, 2023

(87) PCT Pub. No.: WO2022/022893
PCT Pub. Date: Feb. 3, 2022

(65) Prior Publication Data
US 2023/0285647 A1    Sep. 14, 2023

Related U.S. Application Data

(60) Provisional application No. 63/058,022, filed on Jul. 29, 2020.

(51) Int. Cl.
*A61M 1/16*    (2006.01)

(52) U.S. Cl.
CPC ........ *A61M 1/1601* (2014.02); *A61M 1/1688* (2014.02)

(58) Field of Classification Search
CPC .............. A61M 1/1601; A61M 1/1688; A61M 2205/11; A61M 2205/3653; A61M 1/1686; A61M 1/168; A61M 1/1674
See application file for complete search history.

(56) References Cited

U.S. PATENT DOCUMENTS

| | | | |
|---|---|---|---|
| 2012/0138533 A1* | 6/2012 | Curtis ................. | A61M 1/1601 210/85 |
| 2016/0256582 A1* | 9/2016 | Hertz ........................ | A61L 2/04 |
| 2019/0001040 A1 | 1/2019 | Hobro et al. | |

FOREIGN PATENT DOCUMENTS

| | | |
|---|---|---|
| EP | 3085398 A1 | 10/2016 |
| WO | 96/09080 A1 | 3/1996 |
| WO | 96/40314 A1 | 12/1996 |

OTHER PUBLICATIONS

International Search Report from corresponding International Patent Application No. PCT/EP2021/067053, mailed Dec. 20, 2021.

(Continued)

*Primary Examiner* — Rebecca E Eisenberg
*Assistant Examiner* — Matthew Wrubleski
(74) *Attorney, Agent, or Firm* — K&L Gates LLP

(57) ABSTRACT

A renal failure therapy system includes a fresh dialysis fluid tube having a connector for connecting to a dialyzer, a spent dialysis fluid tube having a connector for connecting to the dialyzer, a dialysis fluid circuit including a fresh dialysis fluid line, a spent dialysis fluid line, at least one of (i) a first disinfection device positioned between the fresh dialysis fluid line and the fresh dialysis fluid tube, or (ii) a second disinfection device positioned between the spent dialysis fluid line and the spent dialysis fluid tube and recirculation circuitry extending to a first machine connector for mating with the connector of the fresh dialysis fluid tube during disinfection and a second machine connector for mating with the connector of the spent dialysis fluid tube during disinfection. The system also includes a control unit configured to cause the first and second disinfection devices to be energized during the disinfection.

21 Claims, 10 Drawing Sheets

(56) References Cited

OTHER PUBLICATIONS

Written Opinion from corresponding International Patent Application No. PCT/EP2021/067053, mailed Dec. 20, 2021.

* cited by examiner

RENAL FAILURE THERAPY SYSTEMS HAVING REDUCED TIME BETWEEN TREATMENTS

PRIORITY CLAIM

This application is a national phase entry of PCT/EP2021/067053, filed Jun. 23, 2021, which claims priority to U.S. Provisional Patent Application No. 63/058,022, filed Jul. 29, 2020, the entire disclosures of which are incorporated herein by reference.

BACKGROUND

The present disclosure relates generally to medical fluid treatment and in particular to systems employing medical fluid treatment machines used to treat multiple patients a day.

Hemodialysis ("HD") in general uses diffusion to remove waste products from a patient's blood. A diffusive gradient that occurs across the semi-permeable dialyzer between the blood and an electrolyte dialysis solution causes diffusion. Hemofiltration ("HF") is an alternative renal replacement therapy that relies on a convective transport of toxins from the patient's blood. This therapy is accomplished by adding substitution or replacement fluid to the extracorporeal circuit during treatment (typically ten to ninety liters of such fluid). The substitution fluid and the fluid accumulated by the patient in between treatments is ultrafiltered over the course of the HF treatment, providing a convective transport mechanism, which is particularly beneficial in removing middle and large molecules (in hemodialysis there is a small amount of waste removed along with the fluid gained between dialysis sessions, however, the solute drag from the removal of that ultrafiltrate is typically not enough to provide convective clearance).

Hemodiafiltration ("HDF") is a treatment modality that combines convective and diffusive clearances. HDF flows dialysis fluid through a dialyzer, similar to standard hemodialysis, providing diffusive clearance. In addition, substitution solution is provided directly to the extracorporeal circuit, providing convective clearance.

The above modalities are provided by a dialysis machine. The machines may be provided in a center or in a patient's home. Dialysis machines provided in a center are used multiple times a day for multiple patients and are therefore disinfected between treatments. There are different processes for disinfecting dialysis machines that use different cleaning agents and/or heat disinfection. These techniques, which disinfect the entire dialysis fluid circuit take a long time. Many dialysis clinics need to have a short time between treatments. A patient cannot be dialyzed when a dialysis machine is down between treatments. Also, downtime generally means nurse time. When dialysis treatment is running smoothly, the nurse does not have to attend the machine constantly and may be off performing other tasks. Nursing time is expensive too.

There are accordingly multiple needs to reduce downtime between renal failure therapy treatments as much as possible.

SUMMARY

The present disclosure provides a renal failure therapy system and method that performs hemodialysis ("HD"), hemofiltration ("HF"), hemodiafiltration ("HDF"), isolated ultrafiltration ("UF"), slow continuous ultrafiltration ("SCUF"), continuous renal replacement therapy ("CRRT"), continuous veno-venous hemodialysis ("CVVHD"), continuous veno-venous hemofiltration ("CVVH"), and/or continuous veno-venous hemodiafiltration ("CVVHDF"). Accordingly, "renal failure therapy" as used herein is meant to include any one, or more, or all of the above modalities.

The present disclosure includes multiple embodiments, which each seek to shorten the amount of downtime between treatments for in-center renal failure therapy machines. Currently, the disinfection of the machine is the longest procedure that occurs between treatments. One reason for this is because the entire dialysis circuit is sterilized. The embodiments of the present disclosure take advantage of the fact that only the flexible dialysis fluid tubes leading from the machine to the dialyzer have to be disinfected between treatments. Although there are flexible tubes located inside the machine, those tubes are isolated from the dialyzer, along with non-flexible tubes located inside the machine, enough not to need disinfection between treatments. The embodiments presented herein include various solutions for performing local disinfection on such tubing, which (i) consumes less time and/or (ii) is performed during an ongoing treatment, not after the treatment.

The various solutions include:
(i) the placement of disinfection devices, such as UV disinfection devices, at an end of each flexible to-dialyzer dialysis tube,
(ii) the provision of heated dialysis tubes, e.g., via a resistive heating element located along and/or within the tubes, and
(iii) the provision of two sets of dialysis tubes for use in parallel, wherein one set is disinfected, while the second set is used for treatment.

A first embodiment of the present disclosure uses all three of the solutions listed above. Here, a first set of self-heating dialysis fluid tubes is provided for use during a first treatment, while a second set of self-heating dialysis fluid tubes is provided for use during a second treatment. Prior to a first treatment (e.g., at end of a treatment day or the beginning of a next treatment day), first ends of all four self-heating dialysis fluid tubes are positioned through respective through-ports of the dialysis machine and are plugged into respective UV-disinfection devices. Second ends of the four dialysis fluid tubes are plugged into a connector at the dialysis machine to complete an overall disinfection circuit. Water heated by the heater of the dialysis machine is then flowed through the entire dialysis fluid circuit, including the four tubes of the first and second sets of dialysis fluid tubes, to disinfect both first and second sets of tubes. During this operation, the heating elements for the four self-heating tubes and the four IV disinfection devices may or may not be energized.

During a first treatment of the day, the second ends of the dialysis fluid tubes of the first set are disconnected from the dialysis machine connectors and are plugged into a dialyzer to perform a first treatment during which their heaters are not energized. The second set of dialysis fluid tubes remains plugged into the dialysis machine and are already disinfected, so their heaters may or may not be energized.

The following paragraphs describe why "cleaning fluid" as used herein can be water, dialysis fluid or perhaps a different specialized cleaning fluid if desired. Prior to removal of the second ends of the first set of tubes from their connectors, the first set of tubes is primed with dialysis fluid in preparation for the first treatment, such that the water used for disinfection is removed to drain. During this time, the second set of tubes may also be primed with dialysis fluid, or not, such that the water used for disinfecting the second set of tubes may be discarded or remain, respectively.

Regarding the UV-disinfection devices, any possibility of no UV energization, UV-disinfection devices for the first set only, UV-disinfection devices for the second set only, or for both the first and second sets may be provided during the first treatment. In one preferred embodiment, both sets of UV-disinfection devices are energized during the first treatment.

During a second treatment of the day, (i) the second ends of the dialysis fluid tubes of the first set are disconnected from the dialyzer and are plugged into the dialysis machine connectors to complete a first disinfection pathway, and (ii) the tube heaters are energized to disinfect the first set of tubes during the second treatment. Notably, the dialysis fluid inside of the heated tubes does not need to be moving for disinfection to take place because disinfection occurs due to the heating of the static dialysis fluid within the tubes. The UV-disinfection devices for the dialysis fluid tubes of the first set are energized during disinfection.

If the tubes of the second set have not been primed with dialysis fluid and still contain water, then prior to the second treatment, the second set of tubes is primed with dialysis fluid in preparation for the second treatment, sending the disinfecting water to drain. After priming (if needed), the second ends of the dialysis fluid tubes of the second set are disconnected from the dialysis machine connectors and are plugged into the dialyzer to perform the second treatment during which their heaters are not energized. The UV-disinfection devices for the dialysis fluid tubes of the second set may or may not be energized during treatment. In one preferred embodiment, both sets of UV-disinfection devices are energized during second first treatment.

During a third treatment, the movement of and operation associated with the first and second sets of self-heating dialysis fluid tubes is reversed from the sequence just described for the second treatment. Here, the second ends of the dialysis fluid tubes of the second set are disconnected from the dialyzer and are plugged into the dialysis machine connectors to complete a second disinfection pathway.

The swapping of the first and second sets of tubes just described, one set being used for treatment, while the other set is disinfected for the next treatment, is repeated until the treatment day is done. Delay between treatments due to disinfection may be reduced effectively to zero (assuming only dialysis fluid is used for disinfection, so no priming or flushing), namely, to the time needed to change the tubes of the first and second sets. In an embodiment, the UV-disinfection devices are energized while the tubes are being used for treatment to help prevent bacteria from migrating up the tubes (even if such migration would occur against the direction of flow and flowrates reaching 300 ml/min).

It is contemplated to provide a flushing sequence in which each of the sets of dialysis fluid tubes that has just finished being connected to the dialyzer for the previous treatment is flushed with purified water after being connected to the dialysis machine connectors but prior to being disinfected during a subsequent treatment. To do so, purified water is used to push the dialysis fluid to drain in one embodiment. After the subsequent treatment, the set of water-containing tubes is primed with new dialysis fluid for the next treatment.

A second embodiment of the present disclosure does not use self-heating tubes. The UV-disinfection devices and the two sets of dialysis fluid tubes are used however. Here, the fresh dialysis fluid line and the used or spent dialysis fluid line are each provided with plumbing that forms a fresh circuit recirculation loop and a used circuit recirculation loop, which allow each flexible dialysis fluid tube to become part of a recirculation loop. Each recirculation loop includes a recirculation pump that circulates cleaning fluid dedicated for disinfection (e.g., water or dialysis fluid depending upon priming and/or flushing discussed above) through the UV-disinfection devices to which the flexible dialysis tubes are interchangeably connected. The flow of water or dialysis fluid dislodges bacteria from the inner walls of the recirculation loops. The dislodged bacteria is killed while flowing through the UV-disinfection devices.

Like with the first embodiment, the first and second sets of dialysis fluid tubes are swapped or exchanged, one set being used for treatment, while the other set is connected to the fresh and used circuit recirculation loops and disinfected for the next treatment, until the treatment day is done. Delay between treatments due to disinfection may again be reduced effectively to zero (assuming only dialysis fluid is used for disinfection, so no priming or flushing), namely, to the time needed to change the tubes of the first and second sets.

In an alternative implementation of the second embodiment, the fresh and used circuit recirculation loops are provided with small heaters. The small heaters aid the UV-disinfection devices in disinfecting the flexible dialysis tubes. Either implementation of the second embodiment may employ any priming variation discussed above and may or may not flush dialysis fluid with purified water prior to disinfection.

As with the first embodiment, the UV-disinfection devices in the second embodiment may be energized while the tubes are being used for treatment to help prevent bacteria from migrating up the tubes (even if such migration would occur against the direction of flow and flowrates reaching 300 ml/min).

A third embodiment of the present disclosure uses the self-heating tubes and the UV disinfection devices but does not provide or use two sets of flexible dialysis fluid tubes. The disinfection of the third embodiment accordingly does not occur in parallel with treatment. Here, fresh and used self-heating dialysis fluid tubes are unplugged from the dialyzer after treatment and are plugged into the connectors located at the machine, completing a disinfection circuit that begins in the fresh dialysis fluid line, extends through the fresh self-heating tube, through the used self-heating tube, and through the spent dialysis fluid line to drain.

Once the disinfection circuit is completed, the heating elements for the fresh and used self-heating tubes and the UV-disinfection devices are energized to provide local disinfection of the flexible dialysis fluid tubes. The local disinfection greatly reduces disinfection time, so that after treatment, downtime due to disinfection is not the longest factor.

As with the first and second embodiments, the UV-disinfection devices of the third embodiment may be energized while the tubes are being used for treatment to help prevent bacteria from migrating up the tubes (even if such migration would occur against the direction of flow).

A fourth embodiment of the present disclosure is very similar to the third embodiment but does not use the self-heating tubes and instead provides a small secondary heater in the fresh dialysis fluid line just upstream from the flexible fresh dialysis fluid tube. The disinfection of the fourth embodiment likewise does not occur in parallel with treatment. Here again, fresh and used self-heating dialysis fluid tubes are unplugged from the dialyzer after treatment and are plugged into the connectors located at the machine, completing a disinfection circuit that begins in the fresh dialysis fluid line, extends through the flexible fresh tube, through the used flexible tube, and through the spent dialysis fluid line to drain.

Once the disinfection circuit is completed, the local secondary heater and the UV-disinfection devices are energized to provide local disinfection of the flexible dialysis fluid tubes. The local disinfection greatly reduces disinfection time, so that after treatment, downtime due to disinfection is not the longest factor.

As with the first to third embodiments, the UV-disinfection devices of the fourth embodiment may be energized while the tubes are being used for treatment to help prevent bacteria from migrating up the tubes (even if such migration would occur against the direction of flow).

In light of the technical features set forth herein, and without limitation, in a first aspect, which may be combined with any other aspect described herein (or portion thereof), a renal failure therapy system includes a fresh dialysis fluid tube having a connector for connecting to a dialyzer; a spent dialysis fluid tube having a connector for connecting to the dialyzer; a dialysis fluid circuit including a fresh dialysis fluid line, a spent dialysis fluid line, at least one of (i) a first disinfection device positioned between the fresh dialysis fluid line and the fresh dialysis fluid tube, or (ii) a second disinfection device positioned between the spent dialysis fluid line and the spent dialysis fluid tube, and recirculation circuitry extending to (i) a first machine connector for mating with the connector of the fresh dialysis fluid tube during local disinfection and (ii) a second machine connector for mating with the connector of the spent dialysis fluid tube during local disinfection; and a control unit configured to cause the at least one first or second disinfection device to be energized during the local disinfection, creating a barrier against bacterial transport.

In a second aspect, which may be combined with any other aspect described herein (or portion thereof), the control unit is further configured to energize the at least one first or second disinfection device during treatment.

In a third aspect, which may be combined with any other aspect described herein (or portion thereof), the fresh and spent dialysis fluid tubes are self-heating tubes configured to be energized during the local disinfection.

In a fourth aspect, which may be combined with any other aspect described herein (or portion thereof), the fresh dialysis fluid tube and the spent dialysis fluid tube form a first set of dialysis fluid tubes, and which includes a second set of dialysis fluid tubes, and wherein the control unit is further configured to cause (i) a first treatment to be run with the first or second set of dialysis fluid tubes connected to the dialyzer while the other of the first or second sets of dialysis fluid tubes undergoes local disinfection, and (ii) a second treatment to be run with the disinfected set of dialysis fluid tubes in (i) connected to the dialyzer, while the first treatment set of dialysis fluid tubes in (i) undergoes local disinfection.

In a fifth aspect, which may be combined with any other aspect described herein (or portion thereof), the recirculation circuitry further extends to (i) a third machine connector for mating with the connector of the second fresh dialysis fluid tube during local disinfection and (ii) a fourth machine connector for mating with the connector of the second spent dialysis fluid tube during local disinfection.

In a sixth aspect, which may be combined with any other aspect described herein (or portion thereof), the renal failure therapy system includes a third disinfection device for operation with the second fresh dialysis fluid tube and a fourth disinfection device for operation with the second spent dialysis fluid tube.

In a seventh aspect, which may be combined with any other aspect described herein (or portion thereof), the dialysis fluid circuit includes (i) a first three-way valve, or first pair of two-way valves, positioned and arranged to direct fresh dialysis fluid to either the first disinfection device or the third disinfection device and (ii) a second three-way valve, or second pair of two-way valves, positioned and arranged to accept spent dialysis fluid from either the second disinfection device or the fourth disinfection device.

In an eighth aspect, which may be combined with any other aspect described herein (or portion thereof), (i) a closed way of the first three-way valve, or closed two-way valve of the first pair of two-way valves, forms an end of a first static disinfection pathway, wherein either the first disinfection device or the third disinfection device is located along the first static disinfection pathway and (ii) a closed way of the second three-way valve, or closed two-way valve of the second pair of two-way valves, forms an end of a second static disinfection pathway, wherein either the second disinfection device or the fourth disinfection device is located along the second static disinfection pathway.

In a ninth aspect, which may be combined with any other aspect described herein (or portion thereof), (i) a closed way of the first three-way valve, or closed two-way valve of the first pair, aids in defining a first recirculation disinfection pathway, wherein either the first disinfection device or the third disinfection device is located along the first recirculation disinfection pathway and (ii) a closed way of the second three-way valve, or closed two-way valve of the second pair, forms an end of a second recirculation disinfection pathway, wherein either the second disinfection device or the fourth disinfection device is located along the second recirculation disinfection pathway.

In a tenth aspect, which may be combined with any other aspect described herein (or portion thereof), at least one of the first or second recirculation disinfection pathways is provided with a pump.

In an eleventh aspect, which may be combined with any other aspect described herein (or portion thereof), at least one of the first or second recirculation disinfection pathways is provided with a disinfection heater.

In a twelfth aspect, which may be combined with any other aspect described herein (or portion thereof), the renal failure therapy system includes a local disinfection heater positioned to operate with fresh dialysis fluid line adjacent to the first disinfection device.

In a thirteenth aspect, which may be combined with any other aspect described herein (or portion thereof), at least one of the disinfection devices (90a to 90d) is a UV-disinfection device.

In a fourteenth aspect, which may be combined with any other aspect described herein (or portion thereof), the renal failure therapy system includes at least one through-port for accepting one of the dialysis fluid tubes.

In a fifteenth aspect, which may be combined with any other aspect described herein (or portion thereof), a renal failure therapy system includes a blood treatment unit, first fresh dialysis fluid tube having a connector for connecting to the blood treatment unit forming a first set with a first spent dialysis fluid tube having a connector for connecting to the blood treatment unit; a second fresh dialysis fluid tube having a connector for connecting to the blood treatment unit forming a second set with a second spent dialysis fluid tube having a connector for connecting to the blood treatment unit; and a control unit configured to cause (i) a first treatment to be run with the first or second set of dialysis fluid tubes connected to the blood treatment unit while the other of the first or second set of dialysis fluid tubes undergoes local disinfection, and (ii) a second treatment to be run with the disinfected set of dialysis fluid tubes in (i) connected to the blood treatment unit, while the first treatment set of dialysis fluid tubes in (i) undergoes local disinfection.

In a sixteenth aspect, which may be combined with any other aspect described herein (or portion thereof), at least one of the sets of dialysis fluid tubes that undergoes local disinfection carries dialysis fluid during the local disinfection.

In a seventeenth aspect, which may be combined with any other aspect described herein (or portion thereof), at least one of the sets of dialysis fluid tubes that undergoes local disinfection is flushed with purified water prior to the local disinfection.

In an eighteenth aspect, which may be combined with any other aspect described herein (or portion thereof), at least one of the sets of dialysis fluid tubes that is connected to the blood treatment unit is primed with dialysis fluid prior to connection to the blood treatment unit.

In a nineteenth aspect, which may be combined with any other aspect described herein (or portion thereof), the fresh dialysis fluid tube is a flexible tube and/or the spent dialysis fluid tube is a flexible tube.

In a twentieth aspect, which may be combined with any other aspect described herein (or portion thereof), the recirculation circuitry includes (i) the first machine connector for mating with the connector of the fresh dialysis fluid flexible tube during local disinfection and (ii) the second machine connector for mating with the connector of the spent dialysis fluid flexible tube (74) during local disinfection.

In a twenty-first aspect, which may be combined with any other aspect described herein (or portion thereof), the renal failure therapy system further includes the first disinfection device and the second disinfection device.

In a twenty-second aspect, which may be combined with any other aspect described herein (or portion thereof), wherein the control unit is configured to cause both the first and second disinfection devices to be energized during the local disinfection, creating a barrier against bacterial transport.

In a twenty-third aspect, which may be combined with any other aspect described herein, the fresh dialysis fluid line is provided with a fresh dialysis fluid pump, the control unit configured to drive the fresh dialysis fluid pump to pump fluid towards the fresh dialysis fluid tube.

In a twenty-fourth aspect, which may be combined with any other aspect described herein (or portion thereof), the spent dialysis fluid line is provided with a spent dialysis fluid pump, the control unit configured to drive the spent dialysis fluid pump to pump fluid away from the spent dialysis fluid tube.

In a twenty-fifth aspect, which may be combined with any other aspect described herein, the renal failure therapy system further comprises a bypass line and at least one valve selectively opening and closing the bypass line, the bypass line selectively connecting the fresh dialysis fluid line with the spent dialysis fluid line.

In a twenty-sixth aspect, which may be combined with any other aspect described herein, the fresh dialysis fluid line is provided with a conductivity or a concentration sensor, in particular a conductivity cell, to measure a property of the fresh dialysis fluid flowing therein.

In a twenty-seventh aspect, which may be combined with any other aspect described herein (or portion thereof), the renal failure therapy system further comprises an ultrafiltration ("UF") system to monitor a difference between a fresh dialysis fluid and a spent dialysis fluid flowing in the fresh dialysis fluid line and in the spent dialysis fluid line, respectively.

In a twenty-eighth aspect, which may be combined with any other aspect described herein (or portion thereof), the renal failure therapy system further comprises a housing, wherein the fresh dialysis fluid tube and/or the spent dialysis fluid tube extend from the housing.

In a twenty-ninth aspect, which may be combined with any other aspect described herein (or portion thereof), the renal failure therapy system further comprises a blood treatment unit, such as a dialyzer, during treatment the connector of the fresh dialysis fluid tube being attached to an inlet port of the blood treatment unit and the connector of the spent dialysis fluid flexible tube being attached to an outlet port of the blood treatment unit.

In a thirtieth aspect, which may be combined with any other aspect described herein (or portion thereof), the first disinfection device and/or the second disinfection device comprises a heater heating the fresh and/or spent dialysis fluid flexible tubes during the local disinfection.

In a thirty-first aspect, which may be combined with any other aspect described herein (or portion thereof), the first static disinfection pathway is comprised between said closed way of the first three-way valve, or closed two-way valve of the first pair, and said closed way of the second three-way valve, or closed two-way valve of the second pair, the fluid contained in the first static disinfection pathway being prevented from circulating.

In a thirty-second aspect, which may be combined with any other aspect described herein (or portion thereof), the first recirculation disinfection pathway is provided with a further valve configured in an open way to allow recirculation of fluid along the first recirculation disinfection pathway, in particular wherein a closed way of the further valve prevents fluid recirculation in the first recirculation disinfection pathway.

In a thirty-third aspect, which may be combined with any other aspect described herein (or portion thereof), wherein the second recirculation disinfection pathway is provided with a further valve configured in an open way to allow recirculation of fluid along the second recirculation disinfection pathway, in particular wherein a closed way of the further valve prevents fluid recirculation in the second recirculation disinfection pathway.

In a thirty-fourth aspect, which may be combined with any other aspect described herein (or portion thereof), the renal failure therapy system further includes a blood treatment unit having a blood chamber and a fluid chamber separated by a semipermeable membrane, the fluid chamber including an inlet port and an outlet port, wherein the inlet port is connected to the connector of the fresh dialysis fluid tube and the outlet port is connected to the connector of the spent dialysis fluid tube during treatment.

In a thirty-fifth aspect, which may be combined with any other aspect described herein (or portion thereof), the blood treatment unit includes a dialyzer.

In a thirty-sixth aspect, which may be combined with any other aspect described herein (or portion thereof), the control unit is configured to cause (i) the first extracorporeal blood treatment to be run with the first or second set of dialysis fluid tubes connected to the blood treatment unit while the other of the first or second set of dialysis fluid tubes undergoes local disinfection, and (ii) the second extracorporeal blood treatment to be run with the disinfected set of dialysis fluid tubes in (i) connected to the blood treatment unit, while the first treatment set of dialysis fluid tubes in (i) undergoes local disinfection.

In a thirty-seventh aspect, any of the features, functionality and alternatives described in connection with any one or more of FIGS. 1 to 10 may be combined with any of the features, functionality and alternatives described in connection with any other of FIGS. 1 to 10.

In light of the above aspects and the teachings herein, it is therefore an advantage of the present disclosure to provide hemodialysis, hemofiltration or hemodiafiltration systems and methods that reduce machine downtime.

It is another advantage of the present disclosure to provide hemodialysis, hemofiltration or hemodiafiltration systems and methods that provide local disinfection.

It is a further advantage of the present disclosure to provide hemodialysis, hemofiltration or hemodiafiltration systems and methods that help to prevent the migration of bacteria.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

Figure 1:
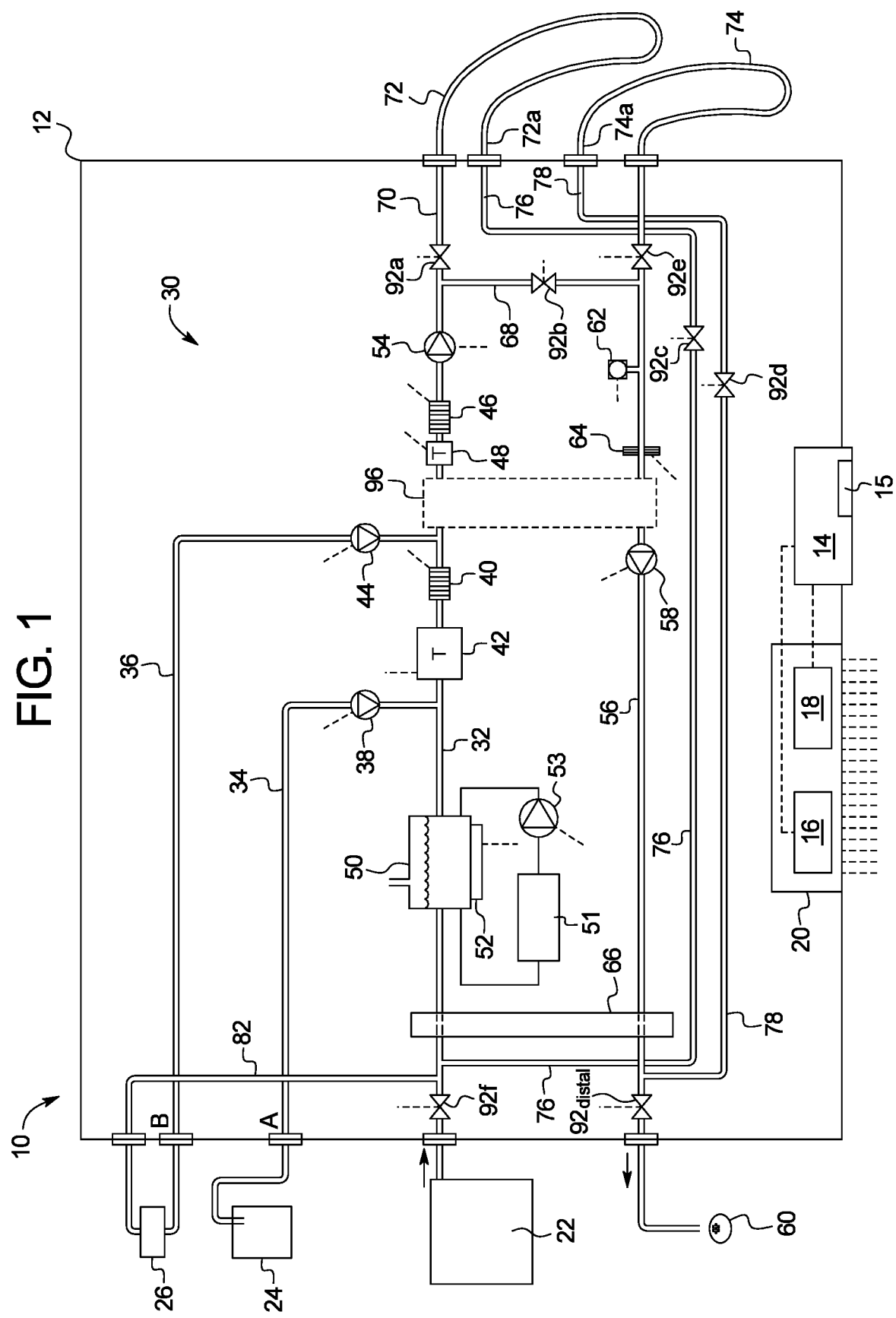
FIG. 1 is a schematic illustration of one embodiment of a renal therapy system, which is modified according to the local disinfection structures described herein.

Referring now to the drawings and in particular to FIG. 1, structures used with the local disinfection embodiments of the present disclosure are illustrated by system 10. System 10 includes a machine 12 having a housing. Machine 12 houses a dialysis fluid circuit 30 described in detail below. Machine 12 also supports a user interface 14, which allows a nurse or other operator to interact with system 10. User interface 14 may have a monitor screen 15 operable with a touch screen overlay, electromechanical buttons, e.g., membrane switches, or a combination of both. User interface 14 is in electrical communication with at least one processor 16 and at least one memory 18. At least one processor 16 and at least one memory 18 also electronically interact with, and where appropriate, control the pumps, valves and sensors described herein, e.g., those of dialysis fluid circuit 30. At least one processor 16 and at least one memory 18 are referred to collectively herein as a control unit 20. The dashed lines extending from control unit 20 lead to pumps, valves, sensors, the heater and other electrical equipment, as indicated by like dashed lines leading from the pumps, valves, sensors, heater, etc.

Dialysis fluid circuit 30 includes a purified water line 32, an A-concentrate line 34 and a bicarbonate B-concentrate line 36. Purified water line 32 receives purified water from a purified water device or source 22. The water may be purified using any one or more process, such as, reverse osmosis, carbon filtering, ultraviolet radiation, electrodeionization ("EDI"), and/or ultrafiltering. One suitable device or source 22 for purifying the water is marketed as a WRO 300 H™ water purification machine.

An A-concentrate pump 38, such as a peristaltic, piston, gear or membrane pump, pumps A-concentrate from an A-concentrate source 24 (which may be a liquid source) into purified water line 32 via A-concentrate line 34. Conductivity cell 40 measures the conductive effect of the A-concentrate on the purified water, sends a signal to control unit 20, which uses the signal to properly proportion the A-concentrate by controlling A-concentrate pump 38. The A-conductivity signal is temperature compensated via a reading from temperature sensor 42.

A B-concentrate pump 44, such as a peristaltic, piston, gear or membrane pump, pumps B-concentrate, e.g., a bicarbonate substance, from a B-concentrate source 26 (which may be a dry powder concentrate source) into purified water line 32 via B-concentrate line 36. Conductivity cell 46 measures the conductive effect of the B-concentrate on the purified water/A-concentrate mixture, sends a signal to control unit 20, which uses the signal to properly proportion the B-concentrate by controlling B-concentrate pump 44. The B-conductivity signal is also temperature compensated via a reading from temperature sensor 48.

An expansion tank 50 deaerates the purified water prior to receiving the concentrates, removing bubbles from the water, which has been degassed in a chamber 51 via a degassing pump 53, located below expansion tank 50. A heater 52 controlled by control unit 20 heats the purified water to body temperature, e.g., 37° C. The fluid exiting conductivity cell 46 is therefore freshly prepared dialysis fluid, properly degassed and heated, and suitable for sending to a dialyzer for treatment. A fresh dialysis fluid pump 54, such as a peristaltic, piston, gear or membrane pump, delivers the fresh dialysis fluid to a dialyzer (see FIG. 2). Control unit 20 controls fresh dialysis fluid pump 54 to deliver fresh dialysis fluid to the dialyzer at a specified flowrate.

A used or spent dialysis fluid pump 58 located along drain line 56 pumps used or spent dialysis fluid, including a patient's ultrafiltration fluid, from the dialyzer to a drain 60. Control unit 20 controls spent dialysis fluid pump 58 to pull spent dialysis fluid from the dialyzer at a specified flowrate. A pressure sensor 62 senses the pressure of spent dialysis fluid within drain line 56 and sends a corresponding pressure signal to control unit 20. A blood leak detector 64, such as an optical detector, looks for the presence of blood in drain line 56, e.g., to detect if a dialyzer membrane has a tear or leak. A heat exchanger 66 recoups heat from the spent dialysis fluid exiting dialysis fluid circuit 30 to drain 60, preheating the purified water traveling towards heater 52 to conserve energy.

UF system 96 monitors the flowrate of fresh dialysis fluid flowing to the dialyzer (FIG. 2, and/or as substitution fluid flowing directly to the blood set) and used fluid flowing from the dialyzer. UF system 96 includes fresh and used flow sensors as part of a UF System Control, which sends signals to control unit 20 indicative of the fresh and spent dialysis fluid flowrate, respectively. Control unit 20 uses the signals to set spent dialysis fluid pump 58 to pump faster than fresh dialysis fluid pump 54 by a predetermined amount to remove a prescribed amount of ultrafiltration ("UF") from the patient over the course of treatment. A second set of fresh and used flow sensors may be provided as part of UF System Protective, which are redundant sensors that ensure UF system 96 is functioning properly.

A bypass line 68 allows fresh dialysis fluid to flow from fresh dialysis fluid line 70 to drain line 56 without contacting the dialyzer. A fresh dialysis fluid tube 72 extends from the housing of machine 12 and carries fresh dialysis fluid from fresh dialysis fluid line 70 to the dialyzer. A spent dialysis fluid tube 74 also extends from the housing of machine 12 and carries spent dialysis fluid from the dialyzer to drain line 56.

System 10 of FIG. 1 provides plural valves 92 (collectively referring to valves 92a to 92f) under the control of control unit 20 to selectively control a filling or priming procedure before treatment, the dialysis treatment, the disinfection sequences described herein, and other sequences and procedures involved with system 10. In particular, valve 92a selectively opens and closes fresh dialysis fluid line 70, valve 92b selectively opens and closes bypass line 68. Valve 92c selectively opens and closes fresh disinfection recirculation line 76. Valve 92d selectively opens and closes used disinfection recirculation line 78. Valve 92e selectively opens and closes drain line 56 to drain 60. If needed, a second drain valve $92_{distal}$ may be provided along drain line 56 downstream from recirculation line 78. Valve 92f selectively opens and closes purified water line 32 to purified water source 22.

It should be appreciated that the dialysis fluid circuit 30 of FIG. 1 is simplified and may include other structure and functionality not illustrated. Also, dialysis fluid circuit 30 illustrates a hemodialysis ("HD") pathway. It is expressly contemplated to provide one or more ultrafilter in fresh dialysis fluid line 70 to create substitution fluid for hemofiltration ("HF"). It is also expressly contemplated to provide one or more ultrafilter in one or more line(s) branching off of fresh dialysis fluid line 70 to create substitution fluid, in addition to the fresh dialysis fluid in line 70, for hemodiafiltration ("HDF").

Figure 2:
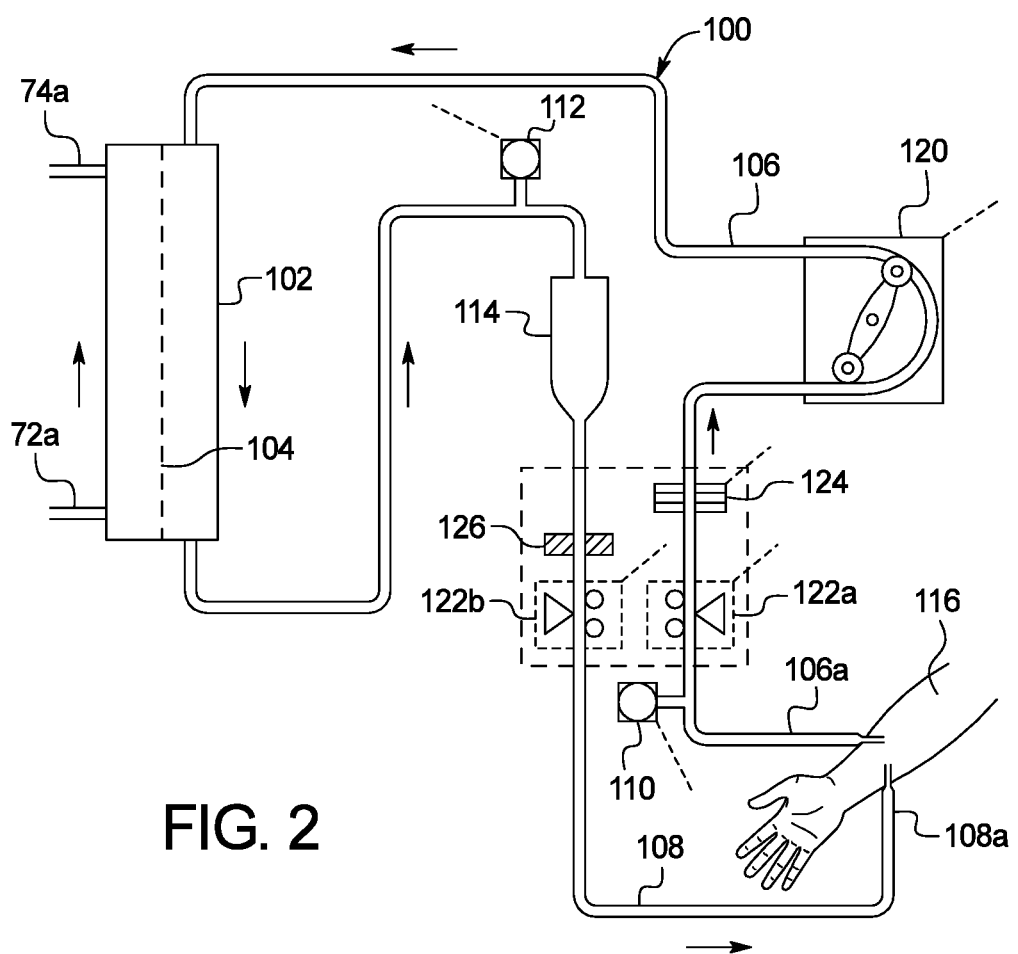
FIG. 2 is an elevation one embodiment of a hemodialysis blood set, which may be used with the renal therapy system of FIG. 1 and any of the local disinfection structures described herein.

Referring now to FIG. 2, blood set 100 illustrates one embodiment of a blood set that may be used with system 10 and any of the local disinfection embodiments of the present disclosure. Blood set 100 includes a dialyzer 102 having many hollow fiber semi-permeable membranes 104, which separate dialyzer 102 into a blood compartment and a dialysis fluid compartment. The dialysis fluid compartment during treatment is placed in fluid communication with distal end 72a of fresh dialysis fluid tube 72 and distal end 74a of used or spent dialysis fluid tube 74. In the local disinfection embodiments discussed below, distal ends 72a and 74a are alternatively plugged sealingly into communication with disinfection recirculation lines 76 and 78 of FIG. 1, respectively. It should be appreciated that for HF, replacement fluid flows from a substitution line (not illustrated) directly to one or both arterial line 106 and venous line 108 of blood set 100, while fresh dialysis fluid line 70 is occluded so that fresh dialysis fluid does not flow to dialyzer 102. For HDF, replacement fluid flows from the substitution line (not illustrated) directly to one or both arterial line 106 and venous line 108 of blood set 100, while fresh dialysis fluid line 70 is opened so that fresh dialysis fluid flows additionally to dialyzer 102.

Arterial pressure pod 110, located upstream of blood pump 120, enables arterial line pressure to be measured, while venous line 108 includes a venous pressure pod 112, enabling venous line pressure to be measured. Pressure pods 110 and 112 are attached to respective blood pressure sensors (not illustrated) mounted on the housing of machine 12, which send arterial and venous pressure signals, respectively, to control unit 20. Venous line 108 includes a venous drip chamber 114, which collects air from the patient's blood before the blood is returned to patient 116.

Arterial line 106 of blood set 100 includes a portion operable with blood pump 120, which is under the control of control unit 20 to pump blood at a desired flowrate. System 10 also provides multiple blood side electronic devices that send signals to and/or receive commands from control unit 20. For example, control unit 20 commands pinch clamps 122a and 122b to selectively open or close arterial line 106 and venous line 108, respectively. A blood volume sensor ("BVS") 124 is located along arterial line 106 upstream of blood pump 120. Air detector 126 looks for air in venous blood line 108.

First Local Disinfection Embodiment

Figure 3:
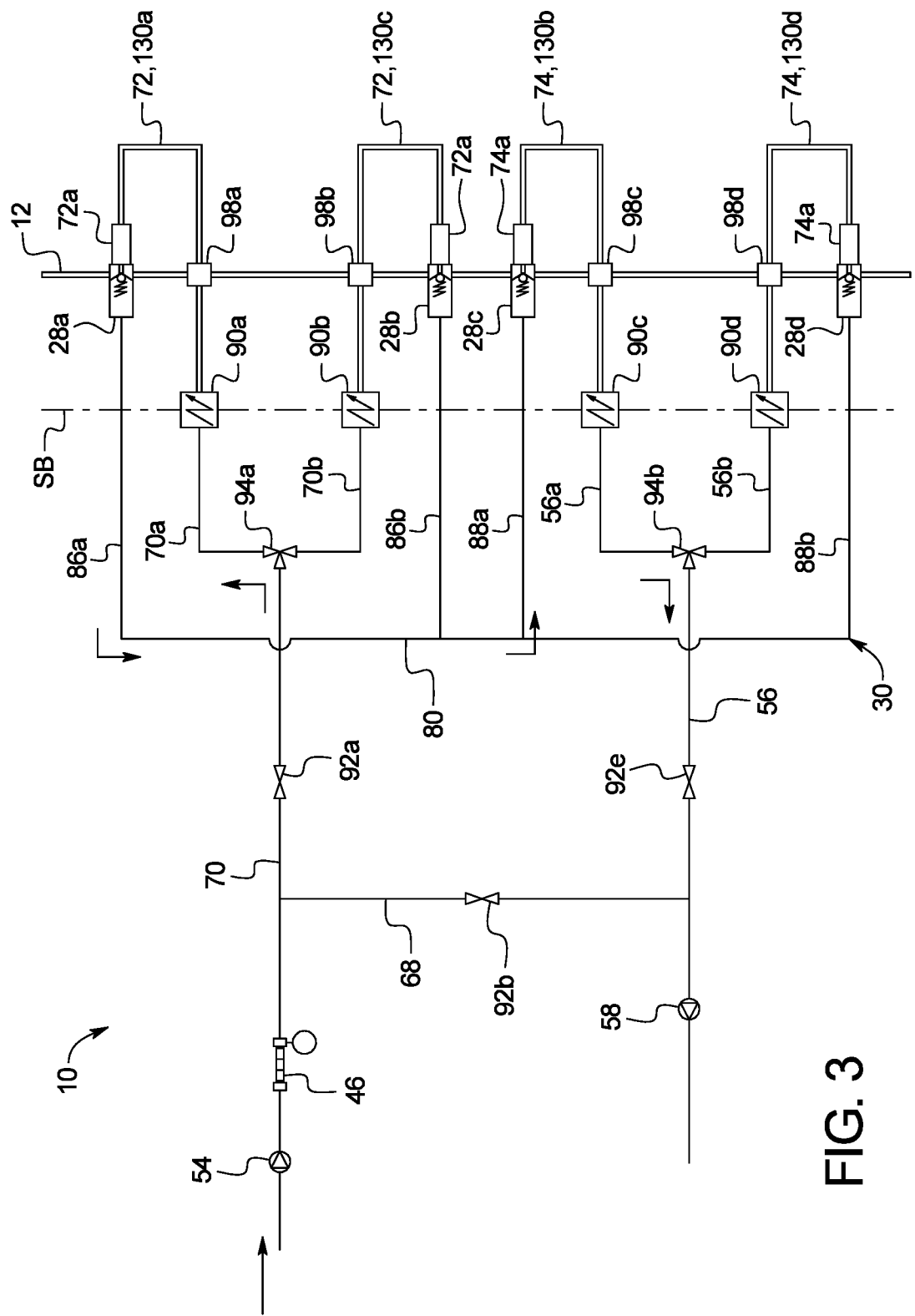
FIG. 3 is a schematic illustration of a portion of the dialysis fluid circuit according to a first local disinfection embodiment of the present disclosure in a first state.

Referring now to FIGS. 3 to 6, a first local disinfection embodiment for system 10 is illustrated. In FIG. 3, system 10 has many of the same components as described above including conductivity cell 46, fresh dialysis fluid pump 54, spent dialysis fluid or drain line 56, spent dialysis fluid pump 58, bypass line 68 and fresh dialysis fluid line 70, all reusable components housed within renal failure therapy fluid machine 12. Here, fresh dialysis fluid line 70 splits into fresh dialysis fluid line segments 70a and 70b extending respectively to local disinfection devices 90a and 90b, which in an embodiment are UV-disinfection devices. Fresh dialysis fluid line segments 70a and 70b branch from fresh dialysis fluid line 70 via a first three-way valve 94a.

In FIG. 3, used or spent dialysis fluid line 56 splits into spent dialysis fluid line segments 56a and 56b extending respectively to local disinfection devices 90c and 90d, which in an embodiment are UV-disinfection devices. Spent dialysis fluid line segments 56a and 56b branch from spent dialysis fluid line 56 via a second three-way valve 94b. In describing the sequences in the four local disinfection embodiments, the valves are open to allow flow in the directions of the arrows where provided in the drawings.

Local disinfection devices 90a to 90d are in an embodiment UV-disinfection devices, which may for example be PearlAqua Micro UVT™ disinfection devices provided by Aquisense Technologies, Erlanger, Ky. 41018, USA. Other types of local disinfection devices may alternatively use heat sterilization, however, a heat disinfection devices would likely need to operate at a high temperature to provide local disinfection, which would present issues relating to thereafter cooling the heated fluid and to its effect on fluid pressure. The dashed vertical line extending through local disinfection devices 90a to 90d indicates a sterile barrier SB, which illustrates that it is a goal for local disinfection devices 90a to 90d to help prevent the migration of bacteria to the left in FIG. 3, namely, into the main portion of dialysis fluid circuit 30.

FIG. 3 also illustrates that the chassis or front wall of machine 12 of renal failure therapy system 10 has attached to it four quick-disconnect bulkhead connectors 28a to 28d, which may be fitted with internal check valves for preventing fluid from backflowing into the flexible dialysis fluid tubes, and four through-ports 98a to 98d for allowing the flexible dialysis fluid tubes to extend through machine 12 for semi-permanent connection to local disinfection devices 90a to 90d.

FIG. 3 further illustrates that system 10 includes fresh recirculation line segments 86a and 86b, and used recirculation line segments 88a and 88b. Each recirculation line segment 86a, 86b, 88a and 88b extends to a recirculation manifold line 80.

FIG. 3 additionally illustrates that in the first local disinfection embodiment of system 10, two sets of self-heating flexible dialysis tubes 72,130a, 74,130b, 72,130c, and 74,130d are provided. Each fresh dialysis flexible to-dialyzer tube 72 is fitted with a quick-disconnect distal end connector 72a, while each spent dialysis to-dialyzer flexible tube 74 is fitted with a quick-disconnect distal end connector 74a. Each quick-disconnect distal end connector 72a and 74a is configured to quickly connect to and release from respective bulkhead connectors 28a to 28d and dialysis fluid ports of dialyzer 102 (FIG. 2). Note that self-heating flexible dialysis tubes 72,130a, 74,130b, 72,130c, and 74,130d extend into machine 12 and up to IV disinfection devices 90a to 90d. Also connectors 72a and 74a are configured such that they may also be disinfected.

Figure 4:
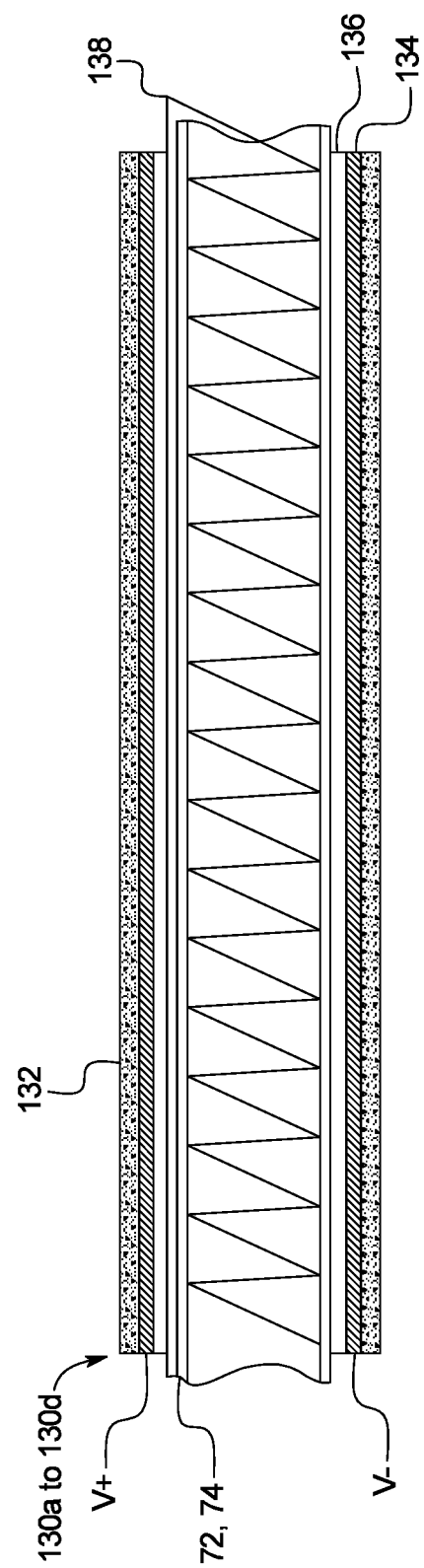
FIG. 4 is a sectioned view of one embodiment for a self-heating tube of the present disclosure.

FIG. 4 illustrates one possible configuration for any of the self-heating tubes used in connection with FIGS. 3, 5, 6 and 9. Here, flexible dialysis tubes 72 and 74 are each inserted within a reusable snug-fitting flexible heating sleeve 130a to 130d. Flexible heating sleeve 130a to 130d includes an outer flexible insulating layer 132 (e.g., fabric) for protecting users from experiencing a hot touch and for directing heat inward to the water or dialysis fluid flowing though the tubes. A flexible resistive heating layer 134 (e.g., resistive coil) is located between insulating layer 132 and a flexible thermally conductive layer 136 (e.g., thin aluminum or copper strip) for evenly distributing heat about flexible dialysis tubes 72 and 74. If needed, a flexible medically safe coil 138 (e.g., stainless steel coil) may be inserted within flexible dialysis tubes 72 and 74 and also extend along the outside of the tubes to contact conductive layer 136 to help distribute heat within the tubes. Electrical leads bringing voltage V+ and V− to the flexible resistive heating layer 134 may extend to a plug and be plugged into machine 12 or elsewhere. Flexible heating sleeve 130a to 130d is configured to bring water or dialysis fluid for disinfection within flexible dialysis tubes 72 and 74 to a desired disinfecting temperature, e.g., 80° C.

FIG. 3 illustrates that prior to a first treatment (e.g., at end of a treatment day or the beginning of a next treatment day), first ends of all four self-heating dialysis fluid tubes 72,130a, 74,130b, 72,130c, 74,130d are positioned through a respective through-port 98a to 98d of renal failure therapy machine 12 and are plugged into a respective UV-disinfection device. While the self-heating dialysis fluid tubes are able to pass through ports 98a to 98d, the ports nevertheless supply a restraining hold, e.g., a spring-biased capture of the self-heating tubes, to prevent the tubes from being pulled out of machine 12, and not to rely on the UV-disinfection devices 90a to 90d for such pull restraint. Quick disconnect ends 72a, 74a of the four dialysis fluid tubes are plugged into a respective quick disconnect connector 28a to 28d at dialysis machine 12 to complete an overall disinfection circuit. Water heated by main heater 52 of the dialysis machine is then flowed through the entire dialysis fluid circuit 30, including the four tubes 72,130a, 74,130b, 72,130c, 74,130d to disinfect both first and second sets of tubes.

The recirculation flowpath of FIG. 3 includes water heated by overall heater 52 (shown in FIG. 1) flowing through fresh line 70 and splitting through fresh segments 70a and 70b, flowing from fresh segments 70a and 70b though flexible to-dialyzer tubes 72,130a and 72,130c, through fresh disinfection segments 86a and 86b to disinfection manifold 80, flowing from manifold 80 through used disinfection segments 88a and 88b, though flexible to-dialyzer tubes 74,130b and 74,130d, through used segments 56a and 56b and drain line 56 to drain 60 (FIG. 1). During this operation, the heating elements 134 for the four self-heating tubes and the four IV disinfection devices 90a to 90d may or may not be energized.

Figure 5:
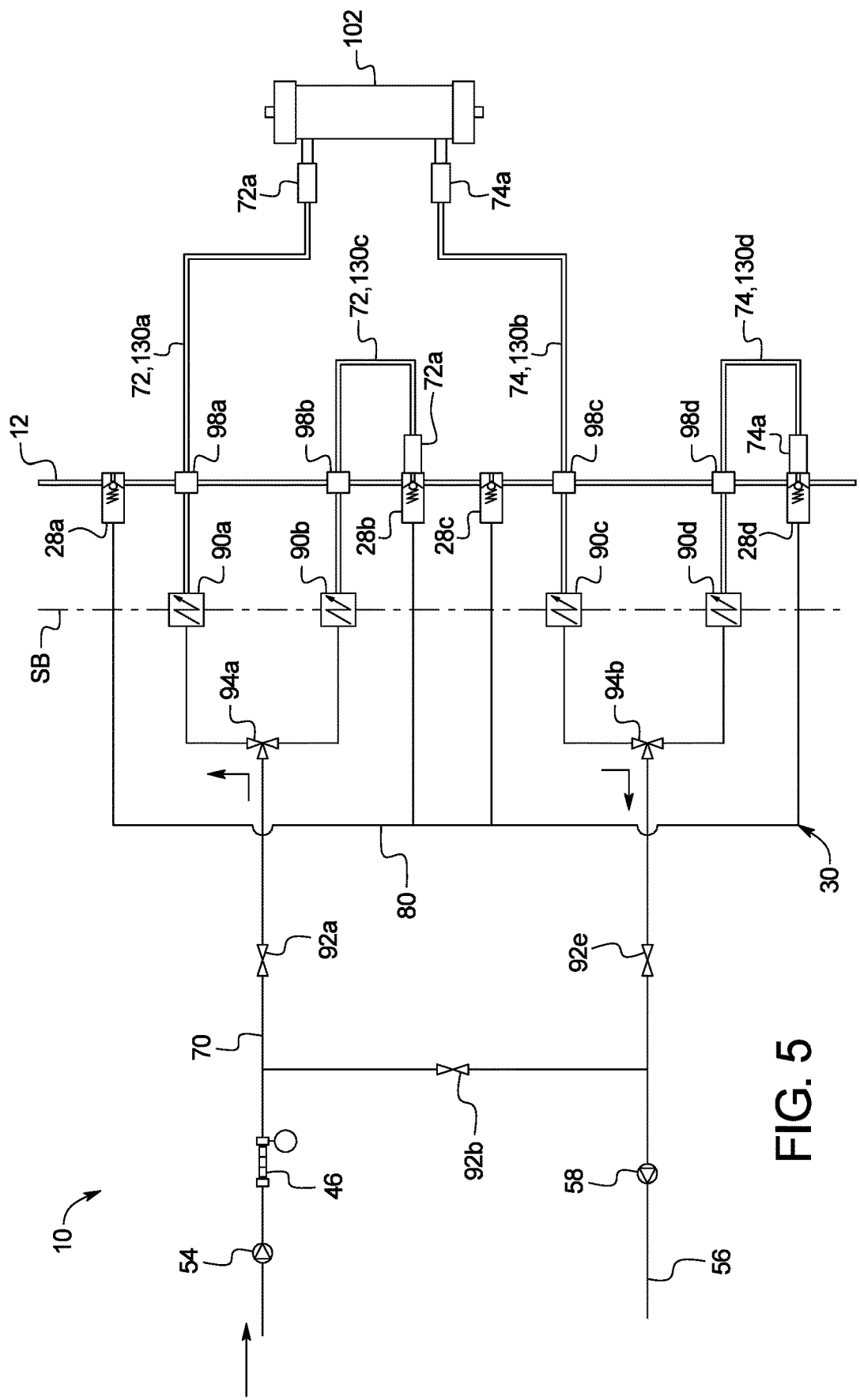
FIG. 5 is a schematic illustration of a portion of the dialysis fluid circuit according to the first local disinfection embodiment of the present disclosure in a second state.

FIG. 5 illustrates that for a first treatment of the day, quick disconnect ends 72a, 74a of the dialysis fluid tubes 72,130a and 74,130b of the first set are disconnected from dialysis machine quick-disconnect connectors 28a and 28c, respectively, and are plugged into fresh and spent dialysis fluid connectors, respectively, of dialyzer 102 to perform a first treatment during which the heaters of tubes 72,130a and 74,130b are not energized as dialysis fluid flows through those tubes. The second set of dialysis fluid tubes 72,130c and 74,130d remains plugged into the quick-disconnect connectors 28b and 28d and are already disinfected, so their heaters may or may not be energized. Regarding disinfection devices 90a to 90d, e.g., UV-disinfection devices, any combination of none, disinfection devices 90a and 90c for the first set only, disinfection devices 90b and 90d for the second set only, or disinfection devices 90a to 90d for both the first and second sets may be energized during the first treatment. In one preferred embodiment, all disinfection devices 90a to 90d are energized during the first treatment.

Prior to removal of the quick disconnect ends 72a, 74a of the dialysis fluid tubes 72,130a and 74,130b of the first set of tubes from their quick-disconnect connectors 28a and 28c, the first set of tubes is primed with dialysis fluid in preparation for the first treatment, such that the water in the tubes used for disinfection is removed to drain 60. To do so, dialysis fluid is pumped via pumps 54 and 58 through dialysis fluid tubes 72,130a and 74,130b of the first set so as to push disinfection water to drain. During this time, the second set of tubes 72,130c and 74,130d may also be primed with dialysis fluid, or not, such that the water used for disinfecting the second set of tubes may be discarded or remain, respectively.

Figure 6:
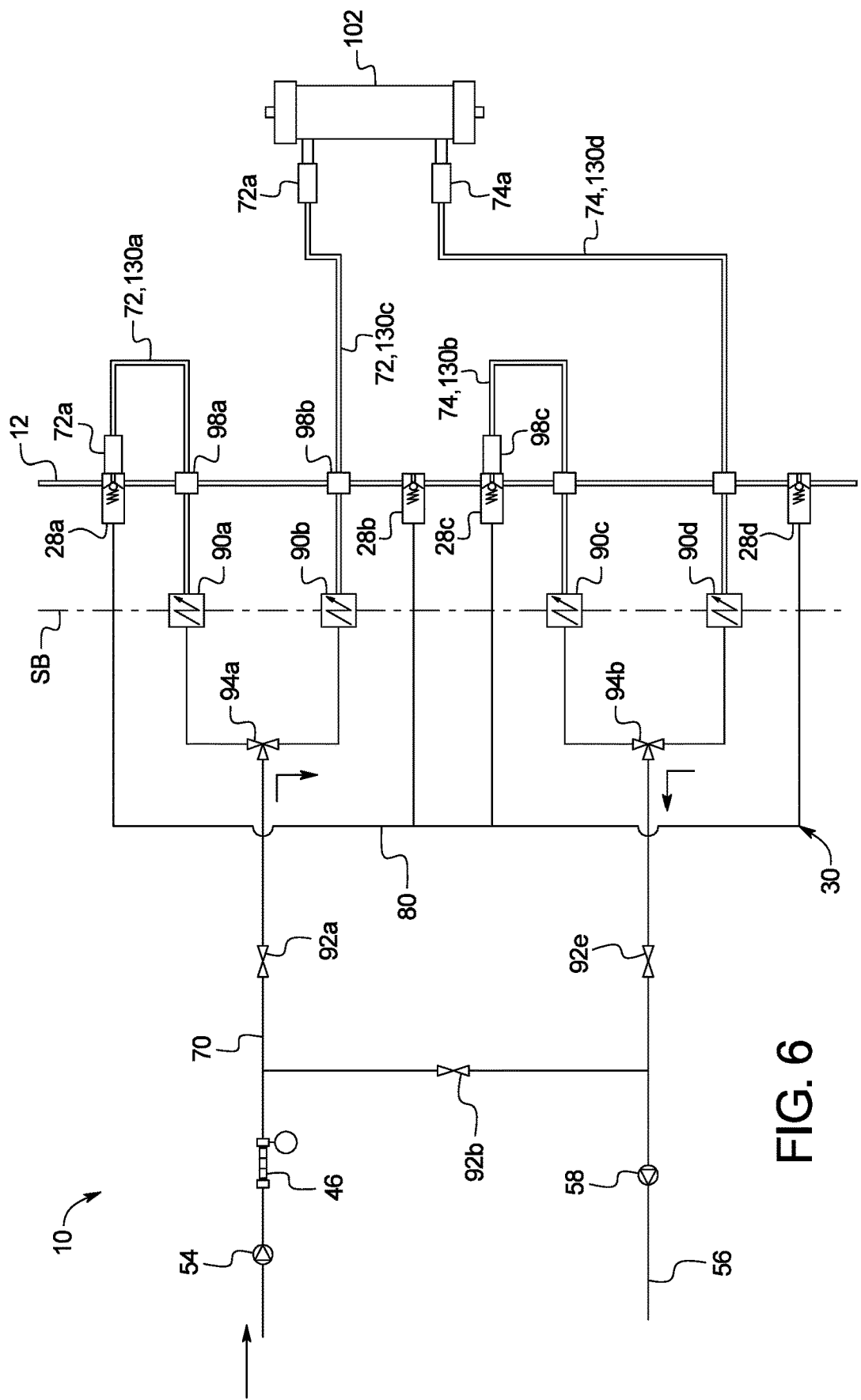
FIG. 6 is a schematic illustration of a portion of the dialysis fluid circuit according to the first local disinfection embodiment of the present disclosure in a third state.

FIG. 6 illustrates that for a second treatment of the day, (i) the quick-disconnect ends 72a and 74a of dialysis fluid tubes 72,130a and 74,130b of the first set are disconnected from dialyzer 102 and are plugged respectively into the quick-disconnect connectors 28a and 28c to complete a first disinfection pathway, and (ii) tube heating elements 134 of self-heating tubes 72,130a and 74,130b are energized to heat dialysis fluid within the tubes to disinfect the first set of tubes while the second treatment is taking place. Notably, dialysis fluid inside of the heated tubes 72,130a and 74,130b does not need to be moving for disinfection to take place because disinfection occurs due to the self-heating of the static dialysis fluid within the tubes. The UV-disinfection devices 90a and 90c for dialysis fluid tubes 72,130a and 74,130b of the first set are energized during disinfection in one embodiment.

During the second treatment of FIG. 6, quick-disconnect ends 72a and 74a of dialysis fluid tubes 72,130c and 74,130d of the second set are disconnected from quick-disconnect machine connectors 28b and 28d and are plugged into dialyzer 102 to perform the second treatment during which their heaters are not energized as dialysis fluid is flowed through tubes 72,130c and 74,130d. If dialysis fluid tubes 72,130c and 74,130d of the second set were primed with dialysis fluid before the first treatment, then the second set does not need to be primed here for the second treatment. However, if dialysis fluid tubes 72,130c and 74,130d of the second set were not primed with dialysis fluid before the first treatment, then the second set needs to be primed here for the second treatment. To do so, dialysis fluid is pumped via pumps 54 and 58 prior to quick-disconnect ends 72a and 74a of dialysis fluid tubes 72,130c and 74,130d of the second set being disconnected from quick-disconnect machine connectors 28b and 28d so as to push disinfection water to drain.

UV-disinfection devices 90b and 90d for the dialysis fluid tubes 72,130c and 74,130d of the second set are energized during treatment in one embodiment. The UV-disinfection devices hinder bacteria from moving across their barriers and hence are effective during treatment. It is accordingly contemplated that UV-disinfection devices 90b and 90d in one embodiment be activated via control unit 50 when upon machine 12 performing a first prime of blood set 100 since the last complete disinfection. When the operator places the dialyzer lines in their docking positions (72a and 74a in FIG. 3) after a final treatment of the day and initiates a complete disinfection, UV-disinfection devices 90b and 90d may then be deactivated. Control unit 50 here is configured to deactivate all UV-disinfection devices upon the commencement of a complete disinfection.

During a third treatment, the movement of and operation associated with the first and second sets of self-heating dialysis fluid tubes is reversed from the sequence just described for the second treatment of FIG. 6 back to the arrangement of FIG. 5. Here, (i) the quick-disconnect ends 72a and 74a of dialysis fluid tubes 72,130c and 74,130d of the second set are disconnected from dialyzer 102 and are plugged respectively into the quick-disconnect connectors 28b and 28d to complete a second disinfection pathway, and (ii) tube heating elements 134 of self-heating tubes 72,130c and 74,130d are energized to heat dialysis fluid within the tubes to disinfect the second set of tubes while the third treatment is taking place. Notably again, dialysis fluid inside the heated tubes 72,130c and 74,130d does not need to be moving for disinfection to take place because disinfection occurs due to the self-heating of the static dialysis fluid within the tubes. UV-disinfection devices 90b and 90d for dialysis fluid tubes 72,130c and 74,130d of the second set are energized during disinfection in one embodiment.

During the third treatment (back to FIG. 5), quick-disconnect ends 72a and 74a of dialysis fluid tubes 72,130a and 74,130b of the first set are disconnected from quick-disconnect machine connectors 28a and 28c and are plugged into dialyzer 102 to perform the third treatment during which their heaters are not energized as dialysis fluid is flowed through tubes 72,130a and 74,130b. For the reasons discussed above, UV-disinfection devices 90a and 90c for the dialysis fluid tubes 72,130a and 74,130b of the first set are energized during treatment in one embodiment.

As mentioned above, dialysis fluid tubes 72,130a and 74,130b complete a first disinfection pathway, while dialysis fluid tubes 72,130c and 74,130d of the second set complete a second disinfection pathway. Those pathways are defined by the states of three-way valves 94a and 94b. The closed ways of valves 94a and 94b form ends of the respective disinfection pathways along with the unconnected quick-disconnect machine connectors 28a to 28d.

The swapping of the first and second sets of tubes just described, one set being used for treatment, while the other set is disinfected for the next treatment, is repeated until the treatment day is done. Delay between treatments due to disinfection may be reduced effectively to zero (assuming only dialysis fluid is used for disinfection, so no priming or flushing), namely, to the time needed to change the tubes of the first and second sets. In an embodiment, the UV-disinfection devices 90a to 90d are energized while their respective tubes are being used for treatment to help prevent bacteria from migrating up the tubes (even if such migration would occur against the direction of flow).

In an alternative implementation of the first embodiment, the set of dialysis fluid tubes that is connected to dialyzer 102 in the prior treatment is flushed with fresh dialysis fluid prior to the start of the next treatment. To do so, when the prior treatment is completed, user interface 14 instructs the operator to plug dialysis fluid line connectors 72a and 74a into their respective quick-disconnect machine connectors 28a to 28d and to confirm when completed (or machine may automatically detect connection. Machine 12 then stops making dialysis fluid and instead pumps purified water via pumps 54 and 58 through fresh line 70, three-way valve 94a, line 70a or 70b, flexible dialysis tubing 72, 130a or 72, 130c, line 86a or 86b, manifold line 80, line 88a or 88b, flexible dialysis tubing 74, 130b or 74, 130d, line 56a or 56b, three-way valve 94a and drain line 58 to drain 60. Control unit 50 controls the flushing to be sufficiently long to rid the flexible lines of the used or spent dialysis fluid as possible, e.g., on the order of minutes, such as two minutes.

When flush is complete, the operator enters "next patient composition" (or happens automatically), machine 12 starts prepares that next fluid composition for the next treatment. Upon detecting that the dialysis fluid has been prepared according to the specified composition, control unit 50 cause machine 12 to prime the flexible dialysis fluid tubing 72, 130a or 72, 130c for use in the subsequent treatment. To do so, machine 12 pumps the fresh dialysis fluid via pumps 54 and 58 through fresh line 70, three-way valve 94a, the other of line 70a or 70b, the other of flexible dialysis tubing 72, 130a or 72, 130c, the other of line 86a or 86b, manifold line 80, the other of line 88a or 88b, the other of flexible dialysis tubing 74, 130b or 74, 130d, the other of line 56a or 56b, three-way valve 94a and drain line 58 to drain 60. Here, control unit 50 controls the priming to be sufficiently long to rid the flexible lines of as much purified water as possible, e.g., on the order of minutes, such as two minutes.

It is therefore contemplated that either dialysis fluid or purified water be used in the flexible tubes being disinfected. The term "disinfection fluid" accordingly includes dialysis fluid, purified water or even a disinfectant, such as a citric acid solution.

Second Local Disinfection Embodiment

Figure 7:
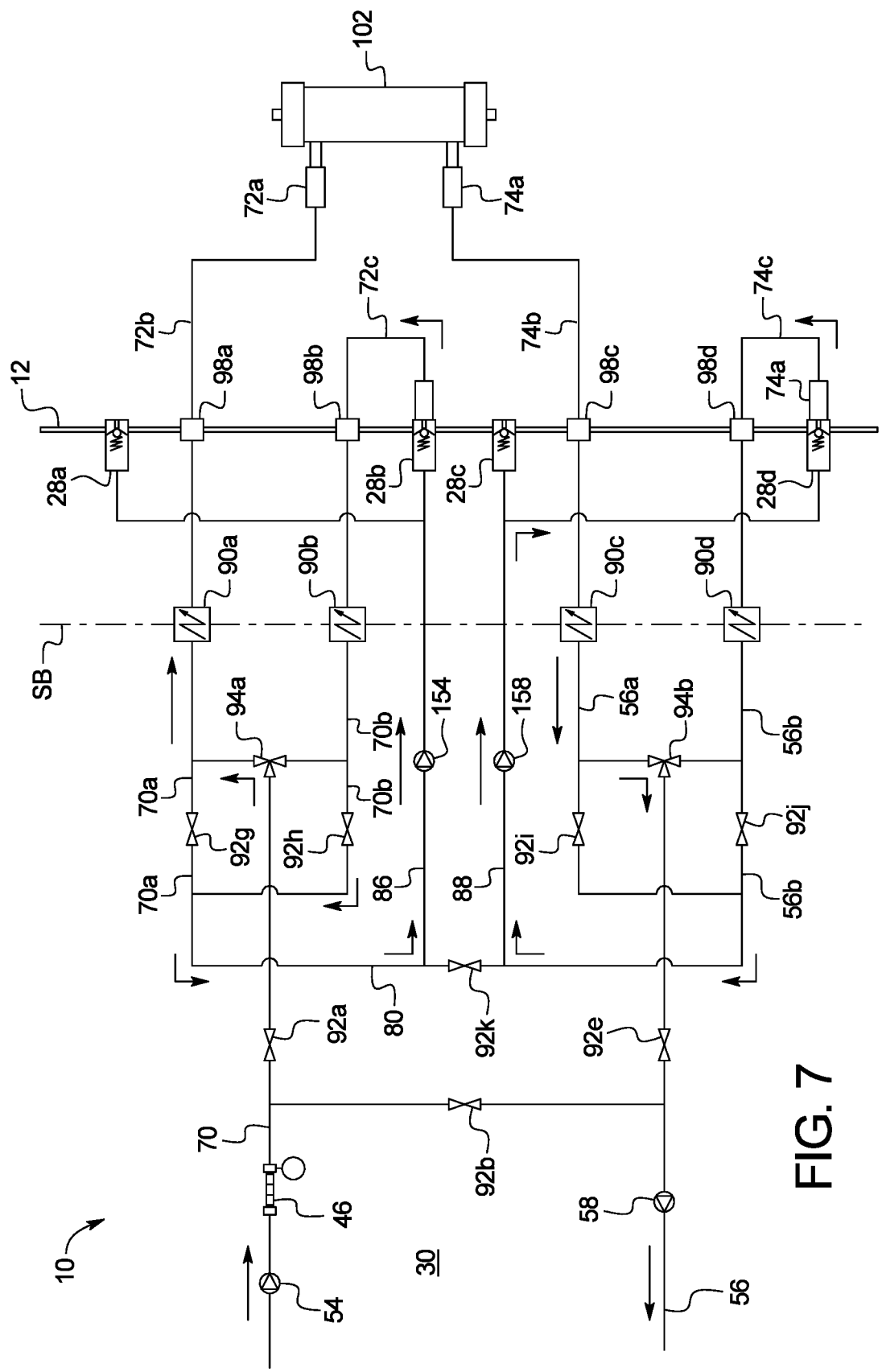
FIG. 7 is a schematic illustration of a portion of the dialysis fluid circuit according to a second local disinfection embodiment of the present disclosure.

FIG. 7 illustrates a second local disinfection embodiment. Here, quick-disconnect machine connectors 28a to 28d are mounted to machine 12 just as described above, through-ports 98a to 98d are mounted to machine 12 just as described above, while flexible dialysis fluid tubes 72b and 74b of the first set and flexible dialysis fluid tubes 72c and 74c of the second set are swapped or exchanged between connecting to dialyzer 102 for treatment and connecting to quick-disconnect machine connectors 28a to 28d for disinfection just as described above. Flexible dialysis fluid tubes 72b, 74b, 72c and 74c are also connected via through-ports 98a to 98d to disinfection devices 90a to 90d, respectively, as described above.

The differences between the second local disinfection embodiment of FIG. 7 and the first local disinfection embodiment of FIGS. 3 to 6 are that dialysis fluid tubes 72b, 74b, 72c and 74c are not self-heating. Disinfection instead occurs using disinfection devices 90a to 90d only. To do so, system 10 of FIG. 7 adds the following recirculation hydraulics. Fresh dialysis fluid line 70 splits into branches 70a and 70b. A valve 92g is located along fresh dialysis fluid branch 70a, which extends between disinfection device 90a and recirculation manifold line 80. A valve 92h is located along fresh dialysis fluid branch 70b, which extends between disinfection device 90b and fresh dialysis fluid branch 70a. A first recirculation pump 154 is located along recirculation line 86, which extends between manifold line 80 and quick-disconnect connector 28b. Recirculation pump 154 may be a peristaltic, piston, gear or membrane pump as with other pumps described above.

Recirculation line 86 along with a portion of manifold line 80, branches 70a and 70b and either flexible dialysis fluid tube 72b or 72c form a first recirculation loop in which recirculation pump 154 pumps cleaning fluid dedicated for disinfection continually past one of disinfection devices 90a or 90b during treatment. The flow of cleaning fluid dislodges bacteria from the inner walls of the recirculation loops. The bacteria is killed while flowing through disinfection device 90a or 90b.

System 10 of FIG. 7 also adds the following recirculation hydraulics. Used or spent dialysis fluid line 56 splits into branches 56a and 56b. A valve 92i is located along spent dialysis fluid branch 56a, which extends between disinfection device 90c and spent dialysis fluid branch 56b. A valve 92j is located along spent dialysis fluid branch 56b, which extends between disinfection device 90d and recirculation manifold line 80. A second recirculation pump 158 is located along recirculation line 88, which extends between manifold line 80 and quick-disconnect connector 28c. Recirculation pump 158 may likewise be a peristaltic, piston, gear or membrane pump as with other pumps described herein. Recirculation line 88 along with a portion of manifold line 80, branches 56a and 56b and either flexible dialysis fluid tube 74b or 74c form a second recirculation loop in which recirculation pump 158 pumps cleaning fluid dedicated for disinfection continually past one of disinfection devices 90c or 90d during treatment.

A valve 92k is located in manifold line 80 between the first and second recirculation loops so as to isolate the loops when desired. Valves 92g to 92k of FIG. 7 and three-way valves 94a and 94b of FIGS. 3, 5 and 6 are under control of control unit 20. The flow of cleaning fluid dislodges bacteria from the inner walls of the recirculation loops. The bacteria is killed while flowing through disinfection device 90c or 90d.

Like with the first local disinfection embodiment of FIGS. 3 to 6, in the embodiment of FIG. 7, flexible to-dialyzer tubes 72b and 74b of the first set and flexible to-dialyzer tubes 72c and 74c of the second set are swapped or exchanged, one set being used for treatment with dialyzer 102, while the other set is connected to the first and second recirculation loops and disinfected for the next treatment, until the treatment day is done. Delay between treatments due to disinfection may again be reduced effectively to zero (assuming only dialysis fluid is used for disinfection, so no priming or flushing), namely, to the time needed to change the tubes of the first and second sets. In an embodiment, the disinfection devices are energized while their corresponding tubes are used for treatment to help prevent bacteria from migrating up the tubes (even if such migration could occur against the direction of flow and flowrates reaching 300 ml/min).

FIG. 7 illustrates the state in which flexible dialysis tubes 72b and 74b are connected to dialyzer 102 for treatment and flexible dialysis tubes 72c and 74c are being disinfected. Fresh and spent dialysis fluid valves 92a and 92e are open so that fresh dialysis fluid may flow to dialyzer 102, while used or spent dialysis fluid may flow from dialyzer 102 to drain 60 (FIG. 1). With valve 92g closed and three-way valve 94a in the state according to the arrows illustrated in FIG. 7, fresh dialysis fluid flows through fresh segment 70a, disinfection device 90a (energized in one embodiment), flexible dialysis tube 72b to dialyzer 102. With flexible dialysis tube 72c connected in disinfection mode to quick-disconnect connector 28b and with valve 92h open and valve 92k closed, cleaning fluid is recirculated by recirculation pump 154 though recirculation line 86, flexible dialysis tube 72c, energized disinfection device 90b, fresh segment 70b, a small portion of fresh segment 70a, and the upper half of manifold line 80, back to recirculation line 86.

On the used side of FIG. 7, fresh and spent dialysis fluid valves 92a and 92e are still open so that fresh dialysis fluid may flow to dialyzer 102, while spent dialysis fluid may flow from dialyzer 102 to drain 60 (FIG. 1). With valve 92i closed and three-way valve 94b in the state illustrated by the arrows in FIG. 7, spent dialysis fluid flows from dialyzer 102, through flexible dialysis tube 74b, disinfection device 90c (energized in one embodiment), a portion of used segment 56a and drain line 56 to drain 60. With flexible dialysis tube 74c connected in disinfection mode to quick-disconnect connector 28d and with valve 92j open and valve 92k closed, cleaning fluid is recirculated by recirculation pump 158 though recirculation line 88, flexible dialysis tube 74c, energized disinfection device 90d, used segment 56b, and the lower half of manifold line 80, back to recirculation line 88.

When the flexible dialysis fluid lines are swapped or exchanged, flexible dialysis tubes 72c and 74c are connected instead to dialyzer 102 for treatment, while flexible dialysis tubes 72b and 74b are disinfected. Here, fresh and spent dialysis fluid valves 92a and 92e remain open and manifold valve 92k remains closed. All other valves labeled in FIG. 7 are switched under control of control unit 20 to the reverse state from that illustrated in FIG. 7. All four disinfection devices 90a to 90d are energized in one embodiment.

Figure 8:
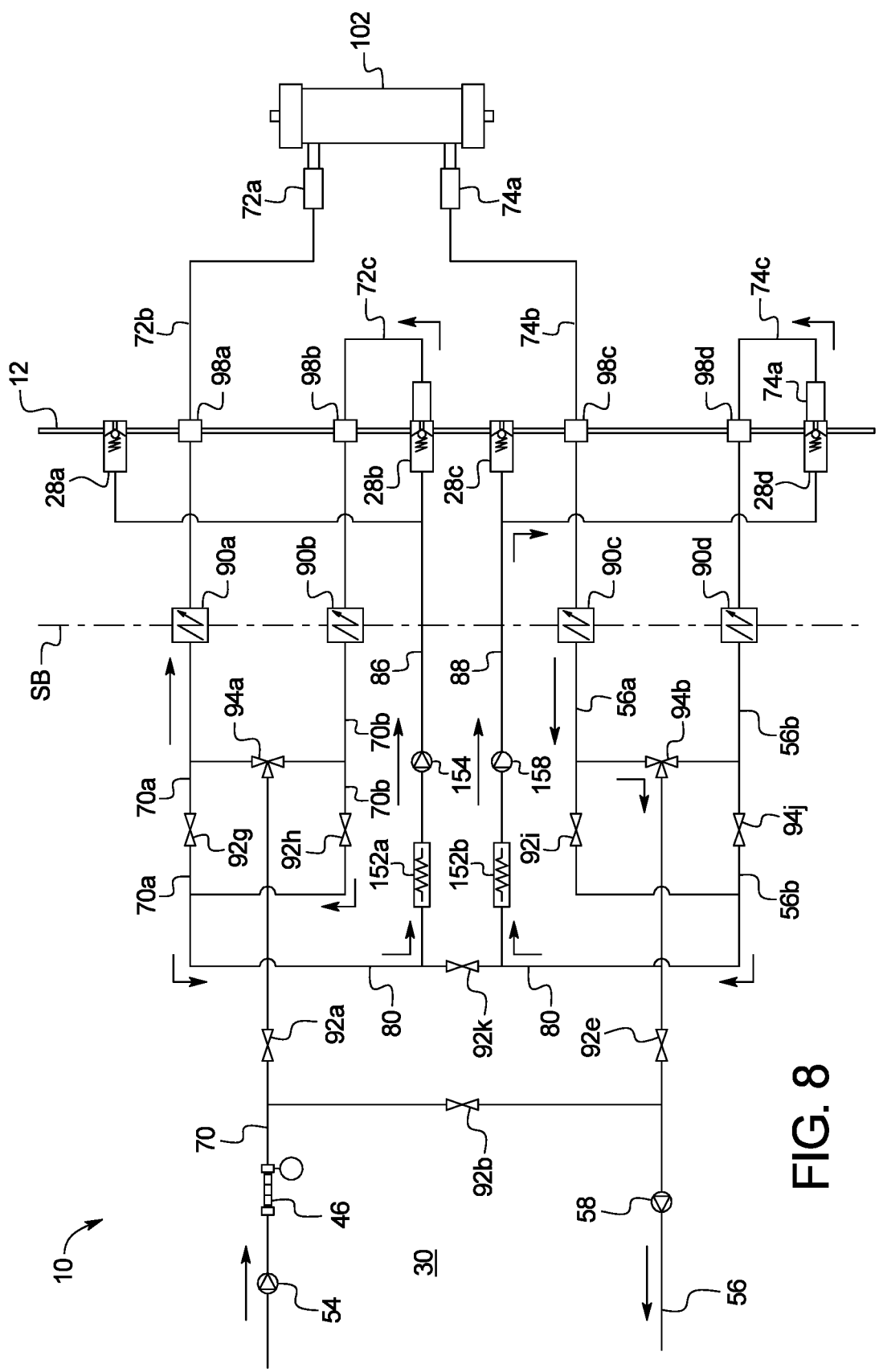
FIG. 8 is a schematic illustration of a portion of the dialysis fluid circuit according to a variation of the second local disinfection embodiment of the present disclosure.

FIG. 8 illustrates a variation of the local disinfection embodiment for system 10 in FIG. 7. In FIG. 8, system 10 includes all of the structure, functionality and alternatives of system 10 in FIG. 7, including all dialysis tube swapping, all valve states and the operation of disinfection devices 90a to 90d. The difference in FIG. 8 is the addition of small heaters 152a and 152b provided in disinfection recirculation lines 86 and 88, respectively. Heaters 152a and 152b are operated during treatment to heat cleaning fluid to a disinfection temperature (e.g., 70° C. or greater, for example, to 80° C. in which an $A_0$ disinfection analysis is employed) to help disinfect the inner surfaces of flexible dialysis tubes 72b, 74b, 72c and 74c. Disinfection devices 90a to 90d are used additionally in one embodiment.

Any of the priming and flushing alternatives discussed above for the first embodiment of FIGS. 3 to 6 is equally applicable to the second embodiment of FIGS. 7 and 8

Third Local Disinfection Embodiment

Figure 9:
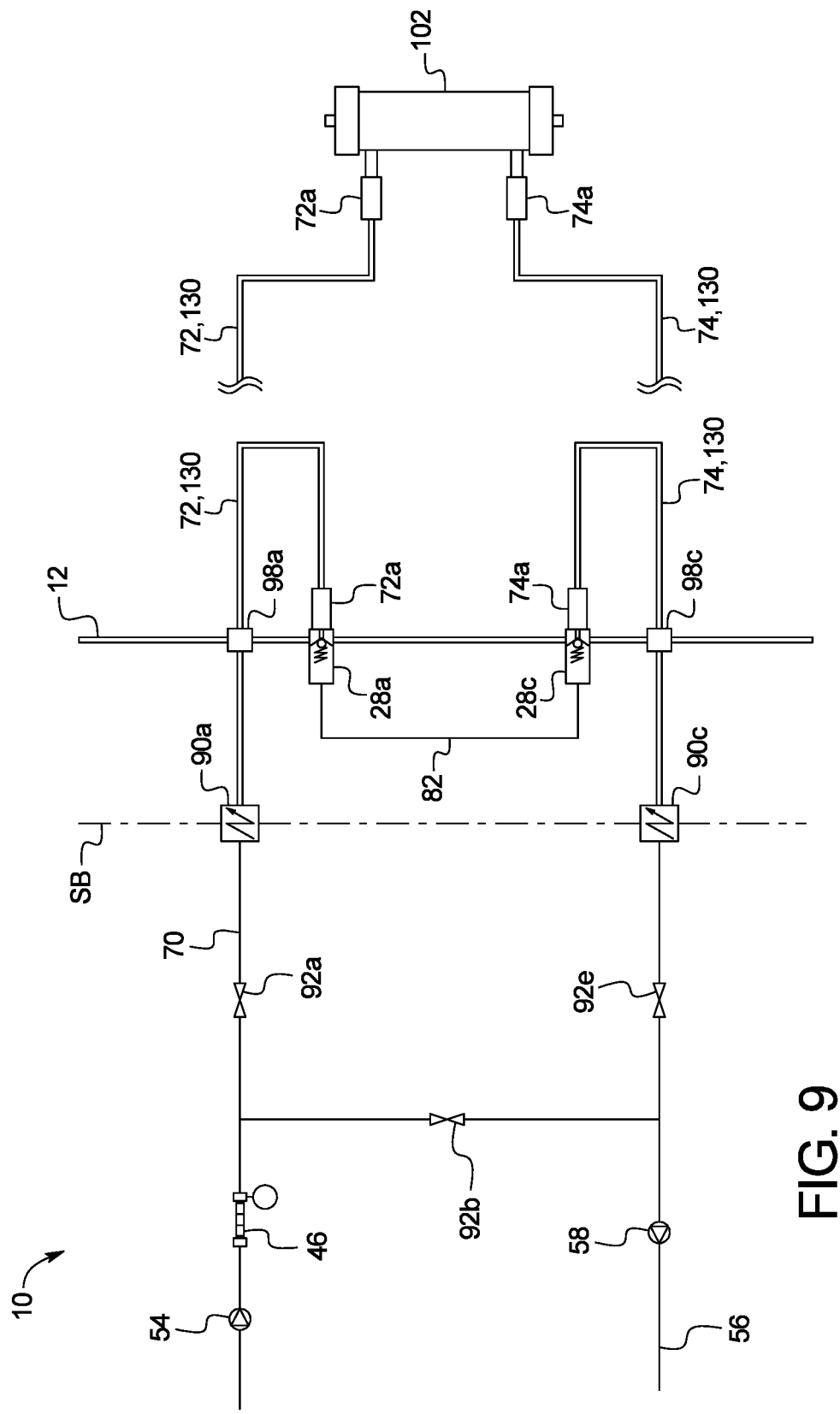
FIG. 9 is a schematic illustration of a portion of the dialysis fluid circuit according to a third local disinfection embodiment of the present disclosure.

FIG. 9 illustrates a third local disinfection embodiment for system 10, which uses the self-heating tubes 72,130 and 74,130 discussed above for the first embodiment and disinfection devices 90a and 90c discussed for each embodiment, but does not provide or use two sets of flexible dialysis fluid tubes. The disinfection of the third embodiment accordingly does not occur in parallel with treatment. Here, quick-disconnect distal end connectors 72a and 74a of respective fresh and used self-heating dialysis fluid tubes 72,130 and 74,130 are unplugged from dialyzer 102 after treatment and are plugged into respective quick-disconnect connectors 28a and 28c located at the wall of machine 12, completing a disinfection circuit that begins in fresh dialysis fluid line 70, extends through the fresh self-heating tube 72,130, through a disinfection line 82, through used self-heating tube 74,130, and through spent dialysis fluid line 56 to drain 60 (FIG. 1). Here, with fresh dialysis fluid line valve 92a and spent dialysis fluid line valve 92e open, either one or both of fresh dialysis fluid pump 54 or spent dialysis fluid pump 58 may be used to pump cleaning fluid dedicated for disinfection through the disinfection circuit just described.

Once the disinfection circuit is completed, the heating elements 134 for the fresh and used self-heating tubes 72,130 and 74,130 and disinfection devices 90a and 90c are energized to provide local disinfection of the flexible dialysis fluid tubes 72,130 and 74,130. The local disinfection greatly reduces disinfection time, so that after treatment, downtime due to disinfection is not the longest factor.

As with the first and second local disinfection embodiments for system 10, disinfection devices 90a and 90c of the third embodiment are energized while self-heating tubes 72,130 and 74,130 are connected to dialyzer 102 for treatment to help prevent bacteria from migrating up the tubes (even if such migration would occur against the direction of flow).

Fourth Local Disinfection Embodiment

Figure 10:
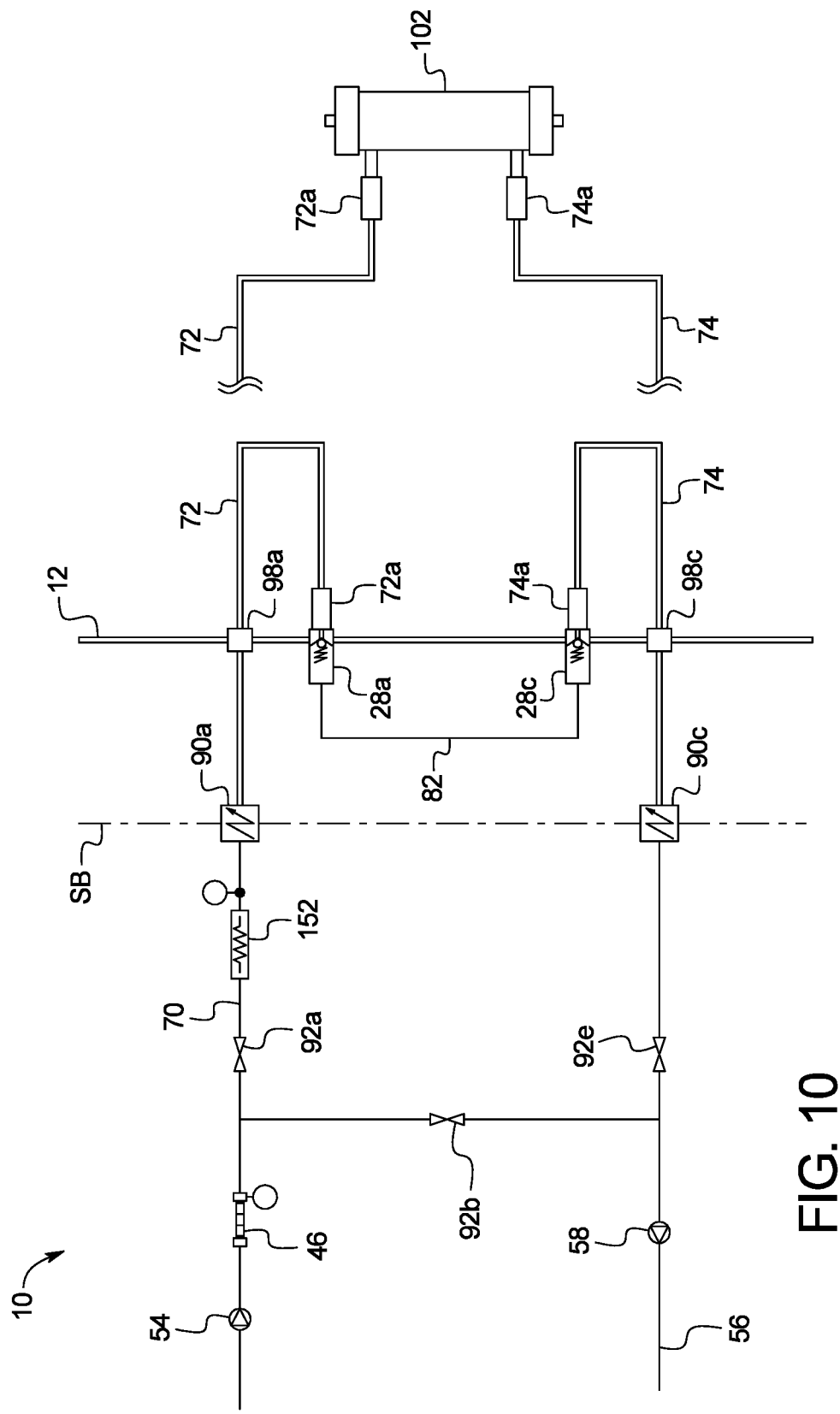
FIG. 10 is a schematic illustration of a portion of the dialysis fluid circuit according to a fourth local disinfection embodiment of the present disclosure.

FIG. 10 illustrates a fourth local disinfection embodiment for system 10. The fourth local disinfection embodiment operates on the same principal as the third embodiment, which does not provide or use two sets of flexible dialysis fluid tubes. The disinfection of the fourth embodiment accordingly does not occur in parallel with treatment. The primary difference between the local disinfection embodiments is that in FIG. 10, self-heating dialysis fluid tubes 72,130 and 74,130 are not used. Instead, a small, local fluid heater 152 is located 30 along fresh dialysis fluid line 70 near disinfection device 90a.

In FIG. 10, quick-disconnect distal end connectors 72a and 74a of respective fresh and used flexible dialysis fluid tubes 72 and 74 are unplugged from dialyzer 102 after treatment and are plugged into respective quick-disconnect connectors 28a and 28c located at the wall of machine 12, completing a disinfection circuit that, again, begins in fresh dialysis fluid line 70, extends through the fresh flexible tube 72, through a disinfection line 82, through used flexible tube 74, and through used or spent dialysis fluid line 56 to drain 60 (FIG. 1). Here, with fresh dialysis fluid line valve 92a and spent dialysis fluid line valve 92e open, either one or both of fresh dialysis fluid pump 54 or spent dialysis fluid pump 58 may be used to pump cleaning fluid dedicated for disinfection through the disinfection circuit just described.

Once the disinfection circuit is completed, the small, local disinfection heater 152 and disinfection devices 90a and 90c are energized to provide local disinfection of the flexible dialysis fluid tubes 72,130 and 74,130. The local disinfection greatly reduces disinfection time, so that after treatment, downtime due to disinfection is not the longest factor. Assuming disinfection with heat is fully effective, disinfection devices 90a and 90c may not need to be energized while small, local heater 152 is energized.

As with the first, second and third local disinfection embodiments for system 10, disinfection devices 90a and 90c of the fourth embodiment are energized while flexible tubes 72 and 74 are connected to dialyzer 102 for treatment to help prevent bacteria from migrating up the tubes (even if such migration would occur against the direction of flow).

It should be understood that various changes and modifications to the presently preferred embodiments described herein will be apparent to those skilled in the art. For example, any of the three-way valves described herein may be replaced by a pair of two-way valves. In another example, local heating may be combined with the self-heating tubes to provide dual local heating. In a further example, any embodiment described herein having any form of disinfection or heating in addition to the disinfection devices may be provided without such disinfection devices. Such changes and modifications may be made without departing from the spirit and scope of the present invention and without diminishing its intended advantages. It is therefore intended that such changes and modifications be covered by the appended claims.

The invention is claimed as follows:

1. A renal failure therapy system comprising:
   a blood treatment unit;
   a first fresh dialysis fluid tube having a connector for connecting to the blood treatment unit forming a first set with a first spent dialysis fluid tube having a connector for connecting to the blood treatment unit;
   a second fresh dialysis fluid tube having a connector for connecting to the blood treatment unit forming a second set with a second spent dialysis fluid tube having a connector for connecting to the blood treatment unit; and
   a control unit configured to cause (i) a first treatment to be run with the first or second set of fresh and spent dialysis fluid tubes connected to the blood treatment unit while the other of the first or second set of fresh and spent dialysis fluid tubes undergoes local disinfection, and (ii) a second treatment to be run with the disinfected set of fresh and spent dialysis fluid tubes in (i) connected to the blood treatment unit, while the set of fresh and spent dialysis fluid tubes used for the first treatment in (i) undergoes local disinfection.

2. The renal failure therapy system according to claim 1, wherein at least one of the first or second sets of fresh and spent dialysis fluid tubes that undergoes local disinfection carries dialysis fluid during the local disinfection.

3. The renal failure therapy system according to claim 1, wherein at least one of the first or second sets of fresh and spent dialysis fluid tubes that undergoes local disinfection is flushed with purified water prior to the local disinfection.

4. The renal failure therapy system according to claim 1, wherein at least one of the first or second sets of fresh and spent dialysis fluid tubes that is connected to the blood treatment unit is primed with dialysis fluid prior to connection to the blood treatment unit.

5. A renal failure therapy system comprising:
a fresh dialysis fluid tube having a connector for connecting to a dialyzer;
a spent dialysis fluid tube having a connector for connecting to the dialyzer, wherein the fresh dialysis fluid tube and the spent dialysis fluid tube form a first set of dialysis fluid tubes;
a second set of dialysis fluid tubes including fresh and spent dialysis fluid tubes;
a dialysis fluid circuit including
a fresh dialysis fluid line,
a spent dialysis fluid line,
at least one of (i) a first disinfection device positioned between the fresh dialysis fluid line and the fresh dialysis fluid tube, and (ii) a second disinfection device positioned between the spent dialysis fluid line and the spent dialysis fluid tube, and
recirculation circuitry extending to (i) a first machine connector for mating with the connector of the fresh dialysis fluid tube during local disinfection and (ii) a second machine connector for mating with the connector of the spent dialysis fluid tube during local disinfection; and
a control unit configured to cause:
at least one of the first or second disinfection device to be energized during the local disinfection, creating a barrier against bacterial transport;
(i) a first treatment to be run with the first or second set of fresh and spent dialysis fluid tubes connected to the dialyzer while the other of the first or second sets of fresh and spent dialysis fluid tubes undergoes local disinfection, and
(ii) a second treatment to be run with the disinfected set of fresh and spent dialysis fluid tubes in (i) connected to the dialyzer, while the first treatment set of fresh and spent dialysis fluid tubes in (i) undergoes local disinfection.

6. The renal failure therapy system according to claim 5, wherein the control unit is further configured to energize the at least one of the first or second disinfection device during treatment.

7. The renal failure therapy system according to claim 5, wherein the fresh and spent dialysis fluid tubes are self-heating tubes configured to be energized during the local disinfection.

8. The renal failure therapy system according to claim 5, wherein the recirculation circuitry further extends to (iii) a third machine connector for mating with the connector of the second fresh dialysis fluid tube during local disinfection and (iv) a fourth machine connector for mating with the connector of the second spent dialysis fluid tube during local disinfection.

9. The renal failure therapy system according to claim 5, further comprising a third disinfection device for operation with the second fresh dialysis fluid tube and a fourth disinfection device for operation with the second spent dialysis fluid tube.

10. The renal failure therapy system according to claim 9, wherein the dialysis fluid circuit additionally includes:
a first three-way valve, or first pair of two-way valves, positioned and arranged to direct fresh dialysis fluid to either the first disinfection device or the third disinfection device; and
a second three-way valve, or second pair of two-way valves, positioned and arranged to accept spent dialysis fluid from either the second disinfection device or the fourth disinfection device.

11. The renal failure therapy system according to claim 10, wherein
a closed way of the first three-way valve, or a closed two-way valve of the first pair of two-way valves, forms an end of a first static disinfection pathway, wherein either the first disinfection device or the third disinfection device is located along the first static disinfection pathway, and
a closed way of the second three-way valve, or a closed two-way valve of the second pair of two-way valves, forms an end of a second static disinfection pathway, wherein either the second disinfection device or the fourth disinfection device is located along the second static disinfection pathway.

12. The renal failure therapy system according to claim 10, wherein
a closed way of the first three-way valve, or a closed two-way valve of the first pair of two-way valves, aids in defining a first recirculation disinfection pathway, wherein either the first disinfection device or the third disinfection device is located along the first recirculation disinfection pathway, and
a closed way of the second three-way valve, or a closed two-way valve of the second pair of two-way valves, forms an end of a second recirculation disinfection pathway, wherein either the second disinfection device or the fourth disinfection device is located along the second recirculation disinfection pathway.

13. The renal failure therapy system according to claim 12, wherein at least one of the first or second recirculation disinfection pathways is provided with a pump.

14. The renal failure therapy system according to claim 12, wherein at least one of the first or second recirculation disinfection pathways is provided with a disinfection heater.

15. The renal failure therapy system according to claim 5, further comprising a local disinfection heater positioned to operate with the fresh dialysis fluid line adjacent to the first disinfection device.

16. The renal failure therapy system according to claim 5, wherein at least one of the first or disinfection devices is a UV-disinfection device.

17. The renal failure therapy system according to claim 5, further comprising at least one through-port for accepting one of the fresh or spent dialysis fluid tubes.

18. A renal failure therapy system comprising:
a housing;
a fresh dialysis fluid flexible tube having a connector for connecting to a dialyzer;
a spent dialysis fluid flexible tube having a connector for connecting to the dialyzer, wherein the fresh dialysis fluid flexible tube and the spent dialysis fluid flexible tube extend from the housing, the fresh dialysis fluid flexible tube and the spent dialysis fluid flexible tube being self-heating tubes;

a dialysis fluid circuit including
  a fresh dialysis fluid line,
  a spent dialysis fluid line,
  a first disinfection device, being a UV-disinfection device, positioned between the fresh dialysis fluid line and the fresh dialysis fluid flexible tube,
  a second disinfection device, being a UV-disinfection device, positioned between the spent dialysis fluid line and the spent dialysis fluid flexible tube, and
  recirculation circuitry extending to (i) a first machine connector for mating with the connector of the fresh dialysis fluid flexible tube during local disinfection and (ii) a second machine connector for mating with the connector of the spent dialysis fluid flexible tube during local disinfection; and a control unit configured to cause the first disinfection device, the second disinfection device, the fresh dialysis fluid flexible tube, and the spent dialysis fluid flexible tube to be energized during the local disinfection, creating a barrier against bacterial transport;

wherein the fresh dialysis fluid flexible tube and the spent dialysis fluid flexible tube form a first set of dialysis fluid tubes, and which includes a second set of dialysis fluid tubes, and wherein the control unit is further configured to cause (i) a first treatment to be run with the first or second set of dialysis fluid tubes connected to the dialyzer while the other of the first or second set of dialysis fluid tubes undergoes local disinfection, and (ii) a second treatment to be run with the disinfected set of dialysis fluid tubes in (i) connected to the dialyzer, while the set of dialysis fluid tubes used for the first treatment in (i) undergoes local disinfection.

19. The renal failure therapy system according to claim 18, wherein the control unit is further configured to energize at least one of the first or second disinfection devices during treatment.

20. The renal failure therapy system according to claim 18, further comprising at least one through-port for accepting one of the fresh dialysis fluid flexible tube or the spent dialysis fluid flexible tube.

21. The renal failure therapy system according to claim 18, wherein the first machine connector and the second machine connector are each fitted with an internal check valve for preventing fluid from back-flowing respectively into the fresh dialysis fluid flexible tube and the spent dialysis fluid flexible tube.

* * * * *